US010088951B2

(12) United States Patent
Shepelev et al.

(10) Patent No.: US 10,088,951 B2
(45) Date of Patent: Oct. 2, 2018

(54) MATRIX SENSOR FOR IMAGE TOUCH SENSING

(71) Applicant: SYNAPTICS INCORPORATED, San Jose, CA (US)

(72) Inventors: Petr Shepelev, Campbell, CA (US); Christopher A. Ludden, Pittsford, NY (US); Jeffrey Lukanc, San Jose, CA (US); Stephen L. Morein, San Jose, CA (US); Greg P. Semeraro, Fairport, NY (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 161 days.

(21) Appl. No.: 14/750,721

(22) Filed: Jun. 25, 2015

(65) Prior Publication Data
US 2015/0293642 A1    Oct. 15, 2015

Related U.S. Application Data

(63) Continuation of application No. 14/042,661, filed on Sep. 30, 2013.

(51) Int. Cl.
*G06F 3/044*      (2006.01)
*G06F 3/041*      (2006.01)

(52) U.S. Cl.
CPC ............ *G06F 3/0418* (2013.01); *G06F 3/044* (2013.01); *G06F 3/0412* (2013.01);
(Continued)

(58) Field of Classification Search
CPC ...... G06F 3/044; G06F 3/0418; G06F 3/0412; G06F 2203/04112; G06F 2203/04111;
(Continued)

(56) References Cited

U.S. PATENT DOCUMENTS

| 4,087,625 A | 5/1978 | Dym et al. |
| 4,233,522 A | 11/1980 | Grummer et al. |

(Continued)

FOREIGN PATENT DOCUMENTS

| CN | 2436978 Y | 6/2001 |
| CN | 1490713 A | 4/2004 |

(Continued)

OTHER PUBLICATIONS

Gary L. Barrett et al. "Projected Capacitive Touch Technology", "Touch Technology Information Display", www.informationaldisplay.org <http://www.informationaldisplay.org>, Mar. 2010 vol. 26 No. 3, pp. 16-21.

(Continued)

*Primary Examiner* — Vinh T Lam
(74) *Attorney, Agent, or Firm* — Patterson + Sheridan, LLP

(57) ABSTRACT

Embodiments described herein include an input device, a display device having a capacitive sensing device, a processing system and a method for detecting presence of an input object using a capacitive sensing device. In one embodiment, an input device includes a plurality of sensor electrodes arranged in a planar matrix array. Each sensor electrode is coupled to unique routing trace and has an identical geometric plan form that is symmetrical about a center of area of the sensor electrode. The geometric plan form of each sensor electrode includes core and a plurality of protrusions extending outward from the core. The protrusions are configured to overlap with protrusions extending outward from each adjacent sensor electrode of the matrix array.

19 Claims, 13 Drawing Sheets

(52) U.S. Cl.
CPC .............. *G06F 2203/04101* (2013.01); *G06F 2203/04104* (2013.01); *G06F 2203/04106* (2013.01); *G06F 2203/04107* (2013.01); *G06F 2203/04111* (2013.01); *G06F 2203/04112* (2013.01)

(58) Field of Classification Search
CPC . G06F 2203/04107; G06F 2203/04101; G06F 2203/04104; G06F 2203/04106
USPC .................... 345/173–174; 178/18.01–18.08
See application file for complete search history.

(56) References Cited

U.S. PATENT DOCUMENTS

| | | | |
|---|---|---|---|
| 4,237,421 A | 12/1980 | Waldron | |
| 4,264,903 A | 4/1981 | Bigelow | |
| 4,293,987 A | 10/1981 | Gottbreht et al. | |
| 4,484,026 A | 11/1984 | Thornburg | |
| 4,492,958 A | 1/1985 | Minami | |
| 4,550,221 A | 10/1985 | Mabusth | |
| 4,550,310 A | 10/1985 | Yamaguchi et al. | |
| 4,659,874 A | 4/1987 | Landmeier | |
| 4,667,259 A | 5/1987 | Uchida et al. | |
| 4,677,259 A | 6/1987 | Abe | |
| 4,705,919 A | 11/1987 | Dhawan | |
| 4,771,138 A | 9/1988 | Dhawan | |
| 4,878,013 A | 10/1989 | Andermo | |
| 4,954,823 A | 9/1990 | Binstead | |
| 4,999,462 A | 3/1991 | Purcell | |
| 5,053,715 A | 10/1991 | Andermo | |
| 5,062,916 A | 11/1991 | Aufderheide et al. | |
| 5,239,307 A | 8/1993 | Andermo | |
| 5,341,233 A | 8/1994 | Tomoike et al. | |
| 5,406,425 A | 4/1995 | Johnston et al. | |
| 5,424,245 A | 6/1995 | Gurtler et al. | |
| 5,459,463 A | 10/1995 | Gruaz et al. | |
| 5,463,388 A | 10/1995 | Boie et al. | |
| 5,650,597 A | 7/1997 | Redmayne | |
| 5,657,012 A | 8/1997 | Tait | |
| 5,777,596 A | 7/1998 | Herbert | |
| 5,796,183 A | 8/1998 | Hourmand | |
| 5,841,078 A | 11/1998 | Miller et al. | |
| 5,869,790 A | 2/1999 | Shigetaka et al. | |
| 6,054,979 A | 4/2000 | Sellers | |
| 6,168,969 B1 | 1/2001 | Farnworth | |
| 6,188,391 B1 | 2/2001 | Seely et al. | |
| 6,222,522 B1 | 4/2001 | Mathews et al. | |
| 6,256,022 B1 | 7/2001 | Manaresi et al. | |
| 6,281,888 B1 | 8/2001 | Hoffman et al. | |
| 6,288,707 B1 | 9/2001 | Philipp | |
| 6,297,811 B1 | 10/2001 | Kent et al. | |
| 6,307,751 B1 | 10/2001 | Bodony et al. | |
| 6,320,394 B1 | 11/2001 | Tartagni | |
| 6,362,633 B1 | 3/2002 | Tartagni | |
| 6,380,930 B1 | 4/2002 | Van Ruymbeke | |
| 6,452,514 B1 | 9/2002 | Philipp | |
| 6,459,044 B2 | 10/2002 | Watanabe et al. | |
| 6,486,862 B1 | 11/2002 | Jacobsen et al. | |
| 6,512,381 B2 | 1/2003 | Kramer | |
| 6,535,200 B2 | 3/2003 | Philipp | |
| 6,583,632 B2 | 6/2003 | Von Basse et al. | |
| 6,653,736 B2 | 11/2003 | Kishimoto et al. | |
| 6,731,120 B2 | 5/2004 | Tartagni | |
| 6,771,327 B2 | 8/2004 | Sekiguchi | |
| 6,800,930 B2 | 10/2004 | Jackson et al. | |
| 6,825,833 B2 | 11/2004 | Mulligan et al. | |
| 6,879,930 B2 | 4/2005 | Sinclair et al. | |
| 6,892,302 B2 | 5/2005 | Wheeler et al. | |
| 6,910,634 B1 | 6/2005 | Inose et al. | |
| 6,937,031 B2 | 8/2005 | Yoshioka et al. | |
| 6,998,855 B2 | 2/2006 | Tartagni | |
| 7,129,935 B2 | 10/2006 | Mackey | |
| 7,158,125 B2 | 1/2007 | Sinclair et al. | |
| 7,207,060 B2 | 4/2007 | Immonen et al. | |
| 7,218,314 B2 | 5/2007 | Itoh | |
| 7,306,144 B2 | 12/2007 | Moore | |
| 7,327,352 B2 | 2/2008 | Keefer et al. | |
| 7,339,579 B2 | 3/2008 | Richter et al. | |
| 7,348,967 B2 | 3/2008 | Zadesky et al. | |
| 7,382,139 B2 | 6/2008 | Mackey | |
| 7,388,571 B2 | 6/2008 | Lowles et al. | |
| 7,423,219 B2 | 9/2008 | Kawaguchi et al. | |
| 7,423,635 B2 | 9/2008 | Taylor et al. | |
| 7,439,962 B2 | 10/2008 | Reynolds et al. | |
| 7,455,529 B2 | 11/2008 | Fujii et al. | |
| 7,522,230 B2 | 4/2009 | Lee | |
| 7,548,073 B2 | 6/2009 | Mackey et al. | |
| 7,554,531 B2 | 6/2009 | Baker et al. | |
| 7,589,713 B2 | 9/2009 | Sato | |
| 7,663,607 B2 | 2/2010 | Hotelling et al. | |
| 7,683,459 B2 | 3/2010 | Ma et al. | |
| 7,724,243 B2 | 5/2010 | Geaghan | |
| 7,768,273 B1 | 8/2010 | Kalnitsky et al. | |
| 7,786,981 B2 | 8/2010 | Proctor | |
| 7,808,255 B2 | 10/2010 | Hristov et al. | |
| 7,812,825 B2 | 10/2010 | Sinclair et al. | |
| 7,821,274 B2 | 10/2010 | Philipp et al. | |
| 7,821,502 B2 | 10/2010 | Hristov | |
| 7,859,521 B2 | 12/2010 | Hotelling et al. | |
| 7,864,160 B2 | 1/2011 | Geaghan et al. | |
| 7,876,309 B2 | 1/2011 | XiaoPing | |
| 7,973,771 B2 | 7/2011 | Geaghan | |
| 7,977,953 B2 | 7/2011 | Lee | |
| 7,986,152 B2 | 7/2011 | Philipp et al. | |
| 8,040,326 B2 | 10/2011 | Hotelling et al. | |
| 8,059,015 B2 | 11/2011 | Hua et al. | |
| 8,125,463 B2 | 2/2012 | Hotelling et al. | |
| 8,154,533 B2 | 4/2012 | Jung et al. | |
| 8,243,027 B2 | 8/2012 | Hotelling et al. | |
| 8,258,986 B2 | 9/2012 | Makovetskyy | |
| 8,259,078 B2 * | 9/2012 | Hotelling ............. G02F 1/13338 | |
| | | | 345/156 |
| 8,278,571 B2 | 10/2012 | Orsley | |
| 8,305,359 B2 | 11/2012 | Bolender et al. | |
| 8,319,325 B2 | 11/2012 | Henderson et al. | |
| 8,319,747 B2 | 11/2012 | Hotelling et al. | |
| 8,368,657 B2 | 2/2013 | Borras | |
| 8,486,805 B2 | 7/2013 | Zhao et al. | |
| 8,766,409 B2 | 7/2014 | Yu | |
| 9,041,636 B2 * | 5/2015 | Fujioka ............... G09G 3/3648 | |
| | | | 345/173 |
| 9,087,491 B2 | 7/2015 | Nakanishi et al. | |
| 9,116,586 B2 | 8/2015 | Yilmaz | |
| 9,329,721 B1 | 5/2016 | Buuck et al. | |
| 2002/0077313 A1 | 6/2002 | Clayman | |
| 2003/0052867 A1 | 3/2003 | Shigetaka et al. | |
| 2003/0103043 A1 | 6/2003 | Mulligan et al. | |
| 2003/0115466 A1 | 6/2003 | Aull et al. | |
| 2003/0234771 A1 | 12/2003 | Mulligan et al. | |
| 2004/0062012 A1 | 4/2004 | Murohara | |
| 2004/0077313 A1 | 4/2004 | Oba et al. | |
| 2004/0125087 A1 | 7/2004 | Taylor et al. | |
| 2004/0222974 A1 | 11/2004 | Hong et al. | |
| 2004/0239650 A1 | 12/2004 | Mackey | |
| 2004/0252109 A1 | 12/2004 | Trent et al. | |
| 2005/0030048 A1 | 2/2005 | Bolender et al. | |
| 2006/0038754 A1 | 2/2006 | Kim | |
| 2006/0097991 A1 | 5/2006 | Hotelling et al. | |
| 2006/0114240 A1 | 6/2006 | Lin | |
| 2006/0114241 A1 | 6/2006 | Lin | |
| 2006/0232600 A1 | 10/2006 | Kimura et al. | |
| 2007/0008299 A1 | 1/2007 | Hristov | |
| 2007/0222762 A1 | 9/2007 | Van Delden et al. | |
| 2007/0229466 A1 | 10/2007 | Peng et al. | |
| 2007/0229468 A1 | 10/2007 | Peng et al. | |
| 2007/0229469 A1 | 10/2007 | Seguine | |
| 2007/0229470 A1 | 10/2007 | Snyder et al. | |
| 2007/0242054 A1 | 10/2007 | Chang et al. | |
| 2007/0257894 A1 | 11/2007 | Philipp | |
| 2007/0262962 A1 | 11/2007 | XiaoPing et al. | |
| 2007/0262963 A1 | 11/2007 | Xiao-Ping et al. | |
| 2007/0268265 A1 | 11/2007 | XiaoPing | |
| 2007/0273659 A1 | 11/2007 | XiaoPing et al. |

(56) References Cited

U.S. PATENT DOCUMENTS

| | | |
|---|---|---|
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0157782 A1 | 7/2008 | Krah |
| 2008/0158167 A1 | 7/2008 | Hotelling et al. |
| 2008/0158172 A1 | 7/2008 | Hotelling et al. |
| 2008/0158181 A1 | 7/2008 | Hamblin et al. |
| 2008/0158183 A1 | 7/2008 | Hotelling et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1* | 4/2009 | Reynolds ............. G06F 3/0202 178/18.06 |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0194344 A1 | 8/2009 | Harley et al. |
| 2009/0201267 A1 | 8/2009 | Akimoto et al. |
| 2009/0207154 A1 | 8/2009 | Chino |
| 2009/0213082 A1 | 8/2009 | Ku |
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0284495 A1 | 11/2009 | Geaghan et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0322702 A1 | 12/2009 | Chien et al. |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0060608 A1 | 3/2010 | Yousefpor |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0164889 A1 | 7/2010 | Hristov et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0230818 A1 | 9/2010 | Birner et al. |
| 2010/0238134 A1 | 9/2010 | Day et al. |
| 2010/0245286 A1 | 9/2010 | Parker |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0292945 A1 | 11/2010 | Reynolds et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2010/0328257 A1 | 12/2010 | Noguchi et al. |
| 2011/0006832 A1 | 1/2011 | Land et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025629 A1 | 2/2011 | Grivna et al. |
| 2011/0025635 A1 | 2/2011 | Lee |
| 2011/0025639 A1 | 2/2011 | Trend et al. |
| 2011/0032193 A1 | 2/2011 | Szalkowski |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0061949 A1 | 3/2011 | Krah et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0121939 A1 | 5/2011 | Hosomi |
| 2011/0141051 A1 | 6/2011 | Ryu |
| 2011/0169770 A1 | 7/2011 | Mishina et al. |
| 2011/0173684 A1 | 7/2011 | Hurry et al. |
| 2011/0187666 A1 | 8/2011 | Min |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0279400 A1 | 11/2011 | Yilmaz |
| 2011/0298746 A1 | 12/2011 | Hotelling |
| 2011/0304571 A1 | 12/2011 | Kim et al. |
| 2011/0316567 A1 | 12/2011 | Chai et al. |
| 2012/0038585 A1 | 2/2012 | Kim |
| 2012/0043971 A1 | 2/2012 | Maharyta |
| 2012/0044167 A1* | 2/2012 | Nakanishi ............. G06F 3/0412 345/173 |
| 2012/0044171 A1 | 2/2012 | Lee et al. |
| 2012/0044193 A1 | 2/2012 | Peng et al. |
| 2012/0050203 A1 | 3/2012 | Osoinach et al. |
| 2012/0056820 A1 | 3/2012 | Corbridge |
| 2012/0056835 A1 | 3/2012 | Choo et al. |
| 2012/0081335 A1 | 4/2012 | Land et al. |
| 2012/0162584 A1 | 6/2012 | Chang et al. |
| 2012/0206403 A1 | 8/2012 | Wang et al. |
| 2012/0218199 A1 | 8/2012 | Kim et al. |
| 2012/0229419 A1 | 9/2012 | Schwartz et al. |
| 2012/0313901 A1 | 12/2012 | Monson |
| 2013/0016061 A1 | 1/2013 | Souchkov |
| 2013/0033450 A1 | 2/2013 | Coulson et al. |
| 2013/0038565 A1 | 2/2013 | Elloway et al. |
| 2013/0057507 A1 | 3/2013 | Shin et al. |
| 2013/0063375 A1 | 3/2013 | Yoshida et al. |
| 2013/0088372 A1 | 4/2013 | Lundstrum et al. |
| 2013/0088459 A1 | 4/2013 | Yeh et al. |
| 2013/0162570 A1 | 6/2013 | Shin et al. |
| 2013/0173211 A1 | 7/2013 | Hoch et al. |
| 2013/0176273 A1 | 7/2013 | Li et al. |
| 2013/0176281 A1 | 7/2013 | Hotelling et al. |

(56) References Cited

U.S. PATENT DOCUMENTS

| | | | |
|---|---|---|---|
| 2013/0194223 A1 | 8/2013 | Ward et al. | |
| 2013/0207923 A1 | 8/2013 | Mohindra et al. | |
| 2013/0215075 A1 | 8/2013 | Lee et al. | |
| 2013/0229382 A1 | 9/2013 | Huang et al. | |
| 2013/0270702 A1 | 10/2013 | Yu et al. | |
| 2013/0293515 A1* | 11/2013 | Fujioka | G06F 3/044 345/174 |
| 2013/0321296 A1 | 12/2013 | Lee et al. | |
| 2013/0328796 A1 | 12/2013 | Al-Dahle et al. | |
| 2013/0342770 A1 | 12/2013 | Kim et al. | |
| 2014/0002410 A1 | 1/2014 | Lillie et al. | |
| 2014/0028626 A1 | 1/2014 | Maeda et al. | |
| 2014/0071088 A1 | 3/2014 | Hong et al. | |
| 2014/0098057 A1 | 4/2014 | Lee et al. | |
| 2014/0132526 A1 | 5/2014 | Lee et al. | |
| 2014/0152621 A1* | 6/2014 | Okayama | G06F 3/0416 345/174 |
| 2014/0168137 A1 | 6/2014 | Pyo et al. | |
| 2014/0192027 A1 | 7/2014 | Ksondzyk et al. | |
| 2014/0204050 A1 | 7/2014 | Huang et al. | |
| 2014/0217590 A1 | 8/2014 | Nalla et al. | |
| 2014/0232664 A1 | 8/2014 | Henry et al. | |
| 2014/0247239 A1 | 9/2014 | Jamshidi-Roudbari et al. | |
| 2014/0327644 A1 | 11/2014 | Mohindra | |
| 2014/0333563 A1* | 11/2014 | Saitoh | G09G 3/3648 345/173 |
| 2014/0354586 A1 | 12/2014 | Yousefpor et al. | |
| 2015/0002446 A1* | 1/2015 | Ayzenberg | G06F 3/044 345/174 |
| 2015/0002449 A1 | 1/2015 | Lewis et al. | |
| 2015/0002462 A1 | 1/2015 | Zhao et al. | |
| 2015/0002464 A1 | 1/2015 | Nishioka et al. | |
| 2015/0022494 A1 | 1/2015 | Azumi et al. | |
| 2015/0028894 A1 | 1/2015 | Sleeman | |
| 2015/0035783 A1 | 2/2015 | Brillant et al. | |
| 2015/0049041 A1 | 2/2015 | Yousefpor | |
| 2015/0062054 A1 | 3/2015 | Yun et al. | |
| 2015/0062059 A1 | 3/2015 | Ho et al. | |
| 2015/0130747 A1 | 5/2015 | Tsai | |
| 2015/0138137 A1 | 5/2015 | Son et al. | |
| 2015/0177878 A1 | 6/2015 | Cheng et al. | |
| 2015/0261331 A1 | 9/2015 | Goeltzenleuchter | |
| 2015/0268784 A1* | 9/2015 | Kallassi | G01R 27/2605 345/174 |
| 2016/0266719 A1 | 9/2016 | Chang | |
| 2016/0266720 A1 | 9/2016 | Chang | |
| 2016/0357337 A1 | 12/2016 | Li et al. | |

FOREIGN PATENT DOCUMENTS

| | | |
|---|---|---|
| CN | 1716018 A | 1/2006 |
| CN | 102243549 A | 11/2011 |
| CN | 103293785 A | 9/2013 |
| EP | 0810540 A2 | 12/1997 |
| EP | 0919945 A2 | 6/1999 |
| EP | 0977159 A1 | 2/2000 |
| JP | H10-133173 A | 5/1998 |
| JP | 2002-215330 A | 8/2002 |
| JP | 2002-268768 A | 9/2002 |
| JP | 2002268786 A | 9/2002 |
| JP | 2008015755 A | 1/2008 |
| JP | 2010-282462 A | 12/2010 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| JP | 2012198855 A | 10/2012 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |
| WO | WO-2011108650 A1 | 9/2011 |
| WO | WO-2012063788 A1 | 5/2012 |
| WO | WO-2013018911 A1 | 2/2013 |
| WO | WO-2013036672 A1 | 3/2013 |
| WO | WO-2013132857 A1 | 9/2013 |
| WO | WO-2014085069 A1 | 6/2014 |

OTHER PUBLICATIONS

Tsz-Kin Ho et al. "32.3: Simple Single-Layer Multi-Touch Projected Capacitive Touch Panel", SID 2009 Digest, pp. 447-450.

Ken Gilleo. "The Circuit Centennial", Apr. 28, 2003, Total of 7 pages.

International Search Report and Written Opinion, dated Dec. 12, 2014 PCT/US2014055934, Consists of 12 pages.

Japanese Patent Application No. P2014-529868, Office Action dated Nov. 24, 2015, 9 pages.

International Search Report; PCT/US2013/021314 dated Jun. 25, 2013.

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Screens", iTouchInternational. 9 pages.

Quantum Research Application Note An-KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 09 Digest.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", 16 Pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Mike Williams, "Dream Screens from Graphene", Technology Developed at Rice could Revolutionize Touch-Screen Displays. Aug. 2011.

ASIC Packaging Guidebook, Toshiba Corporation. (2000). 35 pages.

Fujitsu Microelectronics Limited. "IC Package." (2002). 10 pages.

International Search Report, PCT/US2013/021314 dated Jun. 25, 2013.

European Search Report, Application No. 14849623.5-1507, dated Jun. 21, 2017 consists of 8 pages.

(56) References Cited

OTHER PUBLICATIONS

Chinese Patent Application No. 201480024486.0, Office Action and Search Report dated Jun. 2, 2017, consists of 32 pages with English Translation.
International Search Report and Written Opinion, dated Aug. 25, 2016 PCT/US2016033990, Consists of 17 pages.

\* cited by examiner

MATRIX SENSOR FOR IMAGE TOUCH SENSING

CROSS REFERENCE TO RELATED APPLICATIONS

This application is a continuation of U.S. patent application Ser. No. 14/042,661, filed on Sep. 30, 2013, which is incorporated by reference in its entirety.

BACKGROUND OF THE INVENTION

Field of the Invention

Embodiments of the present invention generally relate to a method and apparatus for touch sensing, and more specifically, a capacitive touch sensing device having grid electrodes for improved absolute sensing, and methods for using the same.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrode. Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. Absolute capacitance sensing methods are very effective in detecting the presence of a single input object, even when spaced far from the surface of the proximity sensor device.

Other capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of a resulting signal. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit transmitter signals and receive resulting signals. Transcapacitive sensing methods are very effective in detecting the presence of a multiple input objects in a sensing region and input objects that are in motion. However, transcapacitive sensing methods generally rely on compact electric fields which are not very effective for detecting the presence or approach of objects spaced from the surface of the proximity sensor device.

Thus, there is a need for an improved proximity sensor device.

SUMMARY OF THE INVENTION

Embodiments described herein include a display device having a capacitive sensing device, a processing system and a method for detecting presence of an input object using a capacitive sensing device, all of which include a grid electrode for improved absolute sensing. Other embodiments include a display device having a capacitive sensing device, a processing system and a method for detecting presence of an input object using a capacitive sensing device, wherein the capacitive sensing device includes a matrix of discrete sensor electrodes.

In one embodiment, a display device having an integrated capacitive sensing device is provided. The display device includes a plurality of sensor electrodes that each comprise at least one common electrode configured to be driven for display updating and capacitive sensing. A grid electrode is at least partially disposed between a first sensor electrode and a second sensor electrode of the plurality of sensor electrodes. The grid electrode is configured to shield the first sensor electrode and the second sensor electrode. A processing system is coupled to the sensor electrodes and the grid electrode. The processing system is configured to, in a first processing mode, modulate the first sensor electrode and the second sensor electrode to acquire measurements of changes in absolute capacitance indicative of positional information for an input object in a sensing region of the capacitive sensing device based on the measurements.

In another embodiment, a processing system for an input device is provided. The processing system includes a sensor module having sensor circuitry coupled to a grid electrode disposed between a first sensor electrode and a second sensor electrode of a plurality of sensor electrodes. Each of the plurality of sensor electrodes includes at least one common electrode configured to be driven for display updating and capacitive sensing. The sensor module is configured to, in a first mode of operation, modulate the first sensor electrode and the second sensor electrode to acquire measurements of changes in absolute capacitance between the first sensor electrode, the second sensor electrode and an input object and drive the grid electrode with a shielding signal configured to shield the first sensor electrode from the second sensor electrode.

In yet another embodiment, a method for detecting presence of an input object using a capacitive sensing device is provided. The capacitive sensing device has a grid electrode disposed between a first sensor electrode and a second sensor electrode of a plurality of sensor electrodes, wherein each of the plurality of sensor electrodes includes at least one common electrodes of a display device. The method includes acquiring measurements of changes in absolute capacitive sensing by driving onto and receiving with the first sensor electrode while in a first mode of operation, driving the grid electrode with a shielding signal while in the first mode of operation, the shielding signal to shield the first sensor electrode and the second sensor electrode, and determining positional information based on the measurements of changes in absolute capacitive coupling.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
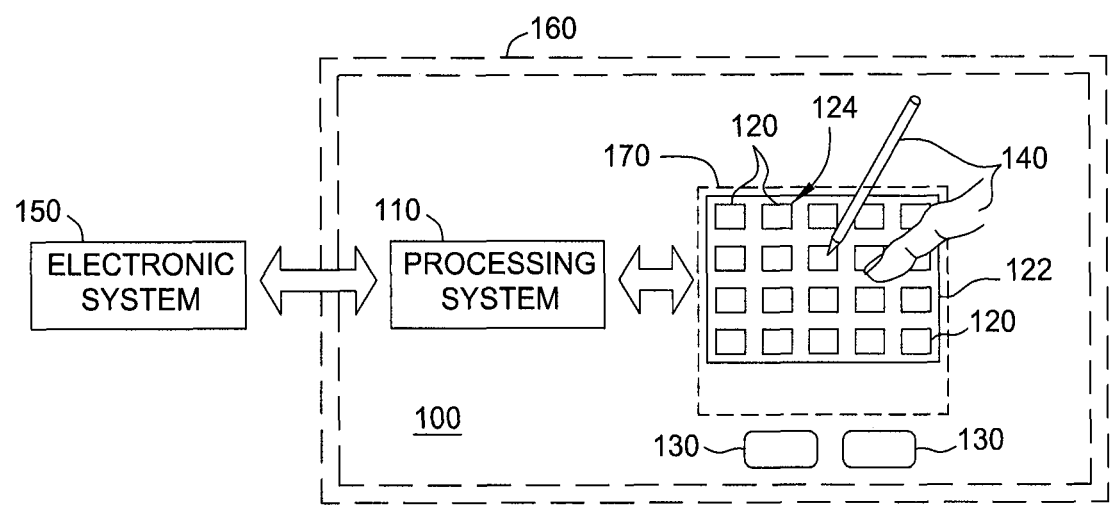
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously utilized absolute sensing techniques to provide good input object location within a sensing region, even in applications where multiple input objects are present or when the input object is in motion. Additionally, some other embodiments provide for switching between absolute and transcapacitive sensing mode, thus allowing the appropriate sensing mode to be utilized to best determine the position and motion of one or more objects within the sensing region.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120 and one or more grid electrodes 122. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
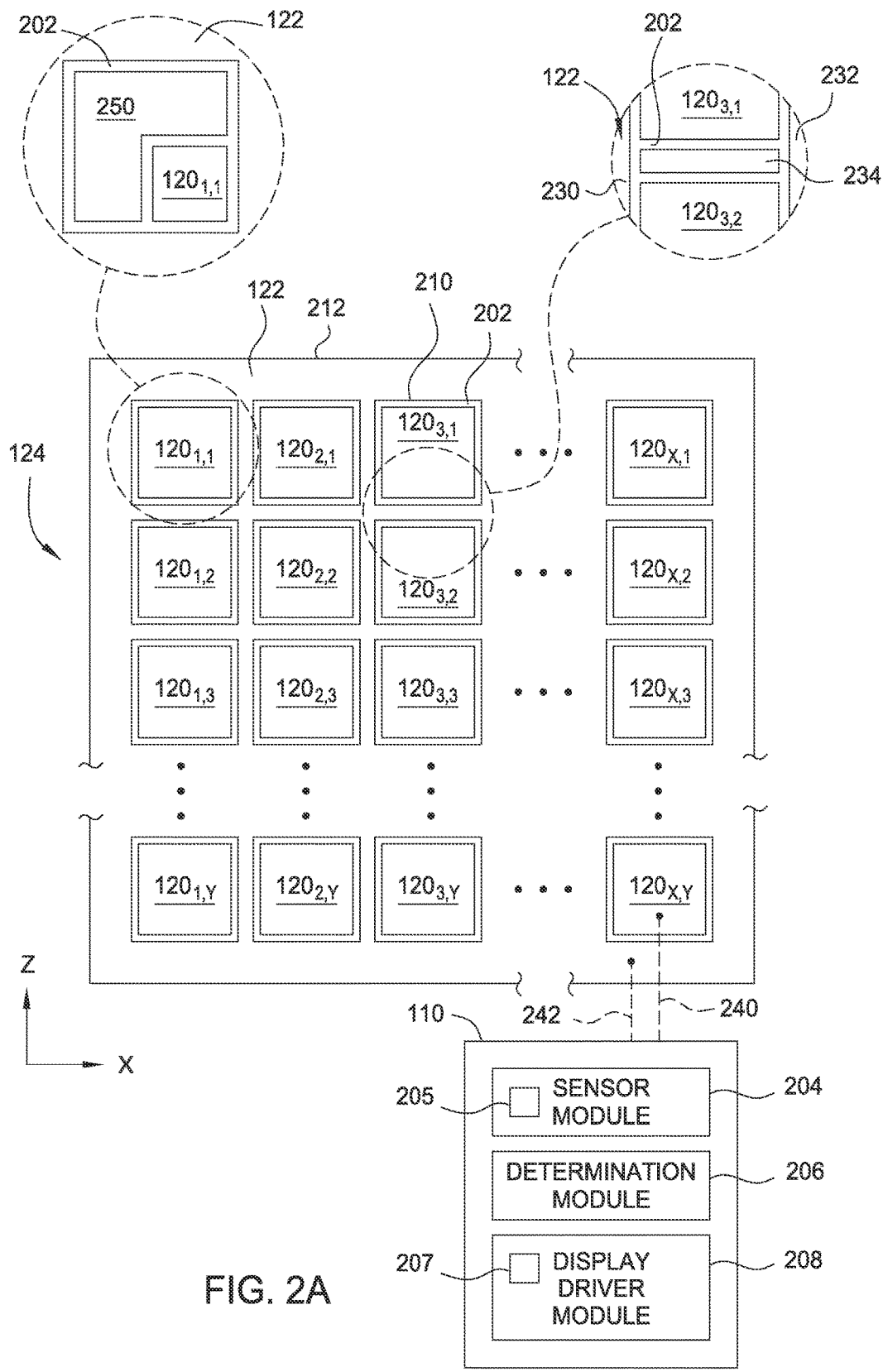
FIG. 2A illustrates a simplified exemplary array of sensor elements that may be used in the input device of FIG. 1.

FIG. 2A shows a portion of an exemplary pattern of sensing elements 124 configured to sense in the sensing region 170 associated with the pattern, according to some embodiments. For clarity of illustration and description, FIG. 2A shows the sensor electrodes 120 of the sensing elements 124 in a pattern of simple rectangles with the grid electrode 122 disposed therebetween, and does not show various other components. The exemplary pattern of sensing elements 124 comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing elements 124 may comprises a plurality of sensor electrodes 120 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 120 is offset from the others, such it extends further in at least one direction than the others. The sensor electrodes 120 and grid electrodes 122 are coupled to the processing system 110 and utilized to determine the presence (or lack thereof) of an input object 140 in the sensing region 170.

In a first mode of operation, the arrangement of sensor electrodes 120 (120-1, 120-2, 120-3, . . . 120-n) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

The sensor electrodes 120 are typically ohmically isolated from each other, and also ohmically isolated from the grid electrode 122. That is, one or more insulators separate the sensor electrodes 120 (and grid electrode 122) and prevent them from electrically shorting to each other. In some embodiments, the sensor electrodes 120 and grid electrode 122 are separated by insulative gap 202. The insulative gap 202 separating the sensor electrodes 120 and grid electrode 122 may be filled with an electrically insulating material, or may be an air gap. In some embodiments, the sensor electrodes 120 and the grid electrode 122 are vertically separated by one or more layers of insulative material. In some other embodiments, the sensor electrodes 120 and the grid electrode 122 are separated by one or more substrates; for example, they may be disposed on opposite sides of the same substrate, or on different substrates. In yet other embodiments, the grid electrode 122 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 120 and the second grid electrode may be configured such that it overlaps at least one of the first and second sensor electrodes 120 and the first grid electrode. Further, the first grid electrode may be configured such that it is disposed between a first and second sensor electrode 120 and the second grid electrode may be configured such that it only overlaps the first grid electrode and is smaller than the first grid electrode.

In a second mode of operation, the sensor electrodes 120 (120-1, 120-2, 120-3, . . . 120-n) may be utilized to detect the presence of an input object via transcapacitive sensing techniques when a transmitter signal is driven onto the grid electrode 122. That is, processing system 110 is configured drive the grid electrode 122 with a transmitter signal and receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 120 and reference voltage in the first mode of operation, between the sensor electrodes 120 and grid electrode 122 in the second mode of operation, and between groups of sensor electrodes 120 used as transmitter and receiver electrodes. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment each of the sensor electrodes 120 are simultaneously driven and received with, obtaining an absolute capacitive measurement simultaneously from each of the sensor electrodes 120. In various embodiments, processing system 110 may configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a course capacitive image that may not be usable to discern precise positional information. However, a course capacitive image may be used to sense presence of an input object. In one embodiment, the course capacitive image may be used to move processing system 110 or the input device 100 out of a doze or low power mode. In one embodiment, the course capacitive image may be used to move a capacitive sensor integrated circuit out of a doze mode or low power mode. In another embodiment, the course capacitive image may be used to move a host integrated circuit out of a doze mode or low power mode. The course capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground or from stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode 122 comprise one or more common electrodes, various other display electrodes as describe above may also be used in conjunction with the common electrode or as an alternative to the common electrodes. In various embodiments, the sensor electrodes 120 and grid electrode 122 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 2A, the processing system 110 coupled to the sensor electrodes 120 includes a sensor module 204 and optionally, a display driver module 208. The sensor module 204 includes circuitry 205 configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 120 and/or grid electrode 122 may be driven differently in different modes of operation. In one embodiment, the sensor electrodes 120 and/or grid electrode 122 may be driven with signals (modulated signals, transmitter signals and/or shield signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The sensor module 204 may be selectively coupled one or more of the sensor electrodes 120 and/or the grid electrode 122. For example, the sensor module 204 may be coupled selected portions of the sensor electrodes 120 and operate in either an absolute or transcapacitive sensing mode. In another example, the sensor module 204 may be a different portion of the sensor electrodes 120 and operate in either an absolute or transcapacitive sensing mode. In yet another example, the sensor module 204 may be coupled to all the sensor electrodes 120 and operate in either an absolute or transcapacitive sensing mode. The sensor module 204 is also configured to operate the grid electrode 122 as a shield electrode. Processing system 110 is configured to operate the grid electrode 122 as a shield electrode that may shield sensor electrodes 120 from the electrical effects of nearby conductors. In one embodiment, processing system is configured to operate the grid electrode 122 as a shield electrode that may shield sensor electrodes 120 from the electrical effects of nearby conductors and guard the sensor electrodes 120 from grid electrode 122, at least partially reducing the parasitic capacitance between the grid electrode 122 and the sensor electrodes 120. In one embodiment, a shielding signal is driven onto the grid electrode 122. The shielding signal may be a ground signal, such as the system ground or other ground, or any other constant voltage (i.e., non-modulated) signal. In another embodiment, operating the grid electrode 122 as a shield electrode may comprise electrically floating the grid electrode. In embodiment, gird electrode 122 is able to operate as an effective shield electrode while being electrode floated due to its large coupling to the other sensor electrodes. In other embodiment, the shielding signal may be referred to as a guarding signal where the guarding signal is a varying voltage signal having at least one of a similar phase, frequency and amplitude as the modulated signal driven on to the sensor electrodes. In one or more embodiment, routing (e.g., traces 240 and/or 242) may be shielded from responding to an input object due to routing beneath the grid electrode 122 and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 204 and display module 208 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g. near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 204 includes circuitry 205 configured to receive resulting signals with the sensing elements 124 comprising effects corresponding to the modulated signals or the transmitter signals during periods in which input sensing is desired. The sensor module 204 may determine a position of the input object 140 in the sensing region 170 or may provide a signal including information indicative of the resulting signal to another module or processor, for example, determination module 206 or a processor of the electronic system 150 (i.e., a host processor), for determining the position of the input object 140 in the sensing region 170.

The display driver module 208 may be included in or separate from the processing system 110. The display driver module 208 includes circuitry 207 confirmed to provide display image update information to the display of the display device 160 during non-sensing (e.g., display updating) periods. In one embodiment, the sensor module 204, and display driver module 208 may be comprised within a common integrated circuit (first controller). In another embodiment, two of the sensor module 204, sensor module 204 and display driver module 208 are comprised in a first integrated circuit and the other one of the three modules is comprised in a second integrated circuit. In those embodiments comprising multiple integrated circuits, a synchronization mechanism may be coupled between them, configured to synchronize display updating periods, sensing periods, transmitter signals, display update signals and the like.

As discussed above, the sensor electrodes 120 of the sensing elements 124 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or the combination of the two. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, molybdenum and conductive carbon materials, among others and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed from a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 120 may comprise a center to center pitch in the range of about 4 to about 5 mm; however, in other embodiments, the pitch may be less than about 4 mm or greater than about 5 mm.

The grid electrode 122 may be fabricated similar to the sensor electrodes 120. The sensor electrodes 120 and the grid electrode 122 may be coupled to the processing system 110 utilizing conductive traces 240, 242 (shown in phantom). The conductive traces 240, 242 may be formed in the same plane at least one of the sensor electrodes 120 and the grid electrode 122, or may be formed on one or more separate substrates and connected to the respective electrodes 120, 122 by vias (not shown). Conductive traces 240 and 242 may be formed on a metal layer disposed such that the sensor electrodes 120 are between the metal layer and the input object. In one embodiment the metal layer comprises source driver lines and/or gate lines for a display device. The conductive traces 240, 242, and vias between them may be obscured from a user by a black mask layer disposed between them and the user of the display device. At least one of the conductive traces 240 and 242 may comprise one or more routing traces (conductors) in the source driver metal layer. In one or more embodiments such a layer may be referred to as metal interconnect layer two. Further, conductive traces 240 and/or 242 may be disposed on a metal layer between source driver lines. Alternately, at least one of the conductive traces 240 and 242 may comprise one or more conductors in the gate driver metal layer or gate driver lines not configured for display updating. Further, conductive traces 240 and/or 242 may be disposed on a metal layer between gate driver lines. In another embodiment, at least one of the conductive traces 240 and 242 may comprise one or more conductors in the Vcom jumper metal layer or Vcom lines not otherwise configured for display updating. Further, conductive traces 240 and/or 242 may be disposed on a metal layer between gate electrodes. In other embodiments the metal layer is included in addition to a layer comprising the source driver lines and/or gate lines. A portion of the conductive traces 140, 142 may also be formed laterally outward of the areal bounds of the sensing elements 124. In various embodiments, the conductive traces 240 and/or 242 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or half source driver" configuration, allowing conductive routing traces 240 and/or 242 to be disposed between source drivers on the source driver layer. In one or more embodiments, orthogonal directions of connections between the conductive traces 240 and 242 they may be place on separate layers with vias between them The grid electrode 122 is disposed between at least two of the sensor electrodes 120. The grid electrode 122 may at least partially circumscribe the plurality of sensor electrodes 120 as a group, and may also, or in the alternative, completely or partially circumscribe one or more of the sensor electrodes 120. In one embodiment, the grid electrode 122 is a planar body 212 having a plurality of apertures 210, each aperture 210 circumscribing a respective one of the sensor electrodes 120. Accordingly, the grid electrode 122 separates and circumscribes at least 3 or more of sensor electrodes 120, and in this example, separates and circumscribes all of sensor electrodes 120. The gap 202 spaces the body 212 from the sensor electrode 120 disposed in the aperture 210. In one or more embodiments, the field electrode 122 is configured to substantially fill the space defined by the gap 202. In one embodiment a second grid electrode may be disposed on a substrate between grid electrode 122 and a touch input layer. The second grid electrode may be the same size as grid electrode 122, or larger than grid electrode 122 such that is overlaps one more sensor electrodes 120 and grid electrode or smaller than grid electrode 122 such that it overlaps a portion of the grid electrode 122. In various embodiments, the grid electrode 122 is disposed between at least two of sensor electrodes 120 such that the grid electrode 122 is on different layer (i.e., different substrate or side of the same substrate) and overlaps a portion of at least two sensor electrodes and the gap between the sensor electrodes. In the embodiments where the sensor electrodes 120 comprise one or more common electrodes, the sensor electrodes may comprise the entirety of the common electrode layer.

The grid electrode 122 may also be segmented. The segmentation of the grid electrode 122 may allow segments of the grid electrode 122 be less visible. The segments may be interconnect using traces or vias, so that the all the segments of the grid electrode 122 may be driven simultaneously with a common signal. Alternatively, one or more of the segments of the grid electrode 122 may be driven independently to facilitate scanning of the sensor electrodes 120 when configured as receiver electrodes in certain modes of operation as discussed further below.

As shown in the enlargement of FIG. 2A, the grid electrode 122 may include a first segment 230, a second segment 232 and a third segment 234. The first and second segments 230, 232 are offset from each other and sandwich a column of sensor electrodes, shown as sensor electrodes 120$_{2,1}$, 102$_{2,2}$. Although not shown in the enlargement, the first segment 230 also separates the column of sensor electrodes 120$_{2,Y}$ from sensor electrode 102$_{1,Y}$ while the second segment 232 separates the column of sensor electrodes 120$_{2,Y}$ from sensor electrode 102$_{3,Y}$. The third segment 234 is disposed between neighboring sensors electrodes 120 within a column, shown as sensor electrodes 120$_{2,1}$, 102$_{2,2}$. Two or more of the segments 230, 232, 234 may be independently driven, for example as transmitter electrodes.

Figure 2B:
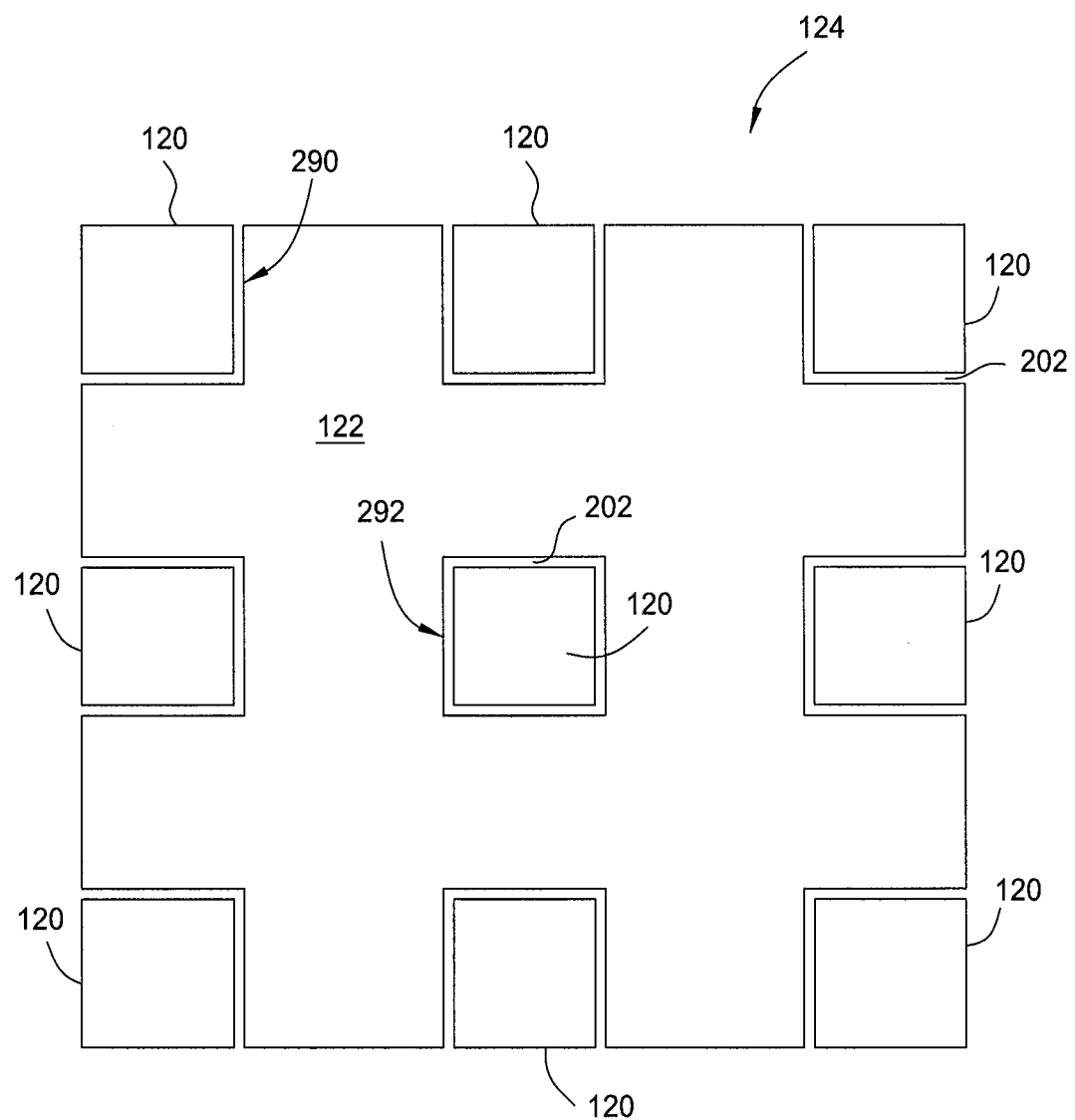
FIG. 2B illustrates an alternative array of sensor elements that may be used in the input device of FIG. 1.

FIG. 2B illustrates an alternative array of sensor elements 124 that may be used in the input device 100 of FIG. 1. As illustrated in FIG. 2B, sensor elements 124 include a grid electrode 122 that may comprise substantially more surface area than the sensor electrodes 120. In the embodiment of FIG. 2B the grid electrode 122 at least partially circumscribes one or more sensor electrodes 120, for example as indicated by reference arrow 290. Additionally, or in the alternative, the grid electrode 122 completely circumscribes at least one sensor electrode 120 and only partially circumscribes other sensor electrodes 120, for example as indicated by reference arrows 290 and 292. In other embodiments, the grid electrode 122 may completely circumscribe all of the sensor electrodes 120. Although not shown in FIG. 2B, it is contemplated that the grid electrode 122 may be segmented as described with reference to FIG. 2A.

Figure 2C:
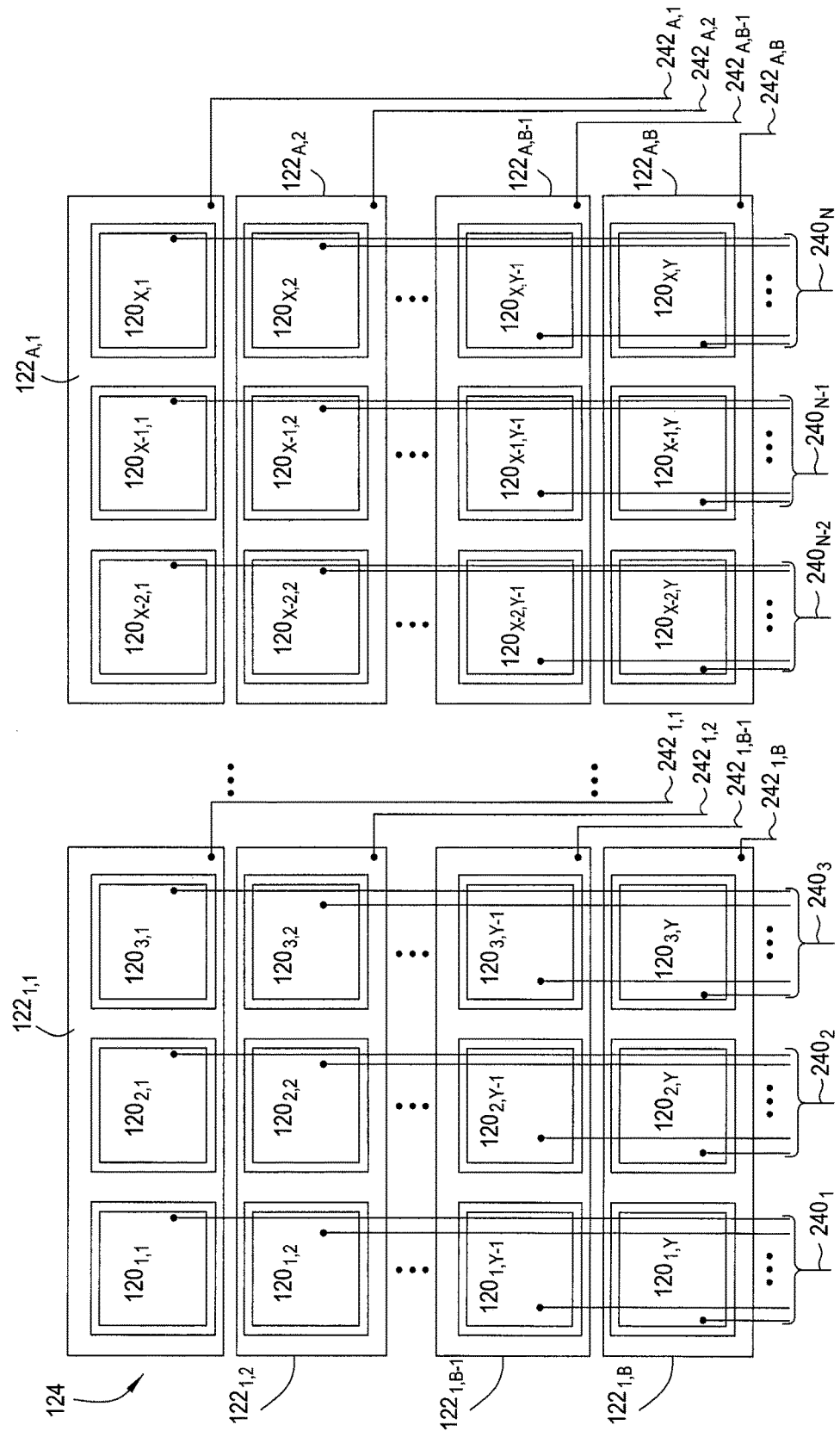
FIG. 2C illustrates an alternative array of sensor elements that may be used in the input device of FIG. 1.

FIG. 2C illustrates an alternative array of sensor elements 124 that may be used in the input device 100 of FIG. 1. As illustrated in FIG. 2C, sensor elements 124 includes more than one grid electrode, collectively referred to as grid electrode 122 and illustratively shown as grid electrodes $122_{(A,B)}$, where A and B are non-zero integers. In the embodiment of FIG. 2C, each grid electrode 122 at least partially circumscribes a different set of sensor electrodes 120, wherein a set of sensor electrodes is defined as a group of sensor electrodes that are at least partially circumscribed by a common one of the grid electrodes 122. Each grid electrode 122 may be substantially similar in and size and circumscribe the same number of sensor electrodes 120; however, in other embodiments, the grid electrodes 122 may differ in at least one of size and the number sensor electrodes 120 at least partially circumscribed. Further, while the embodiment of FIG. 2C illustrates eight rid electrodes 122, in other embodiments, the input device 100 may comprise two or more grid electrodes 122. In one embodiment, each grid electrode 122 may be independently coupled to processing system 110 via different conductive routing traces, shown as traces $242_{(1,1)}$, $242_{(1,B)}$, $242_{(A,1)}$, and $242_{(A,B)}$. In other embodiment, two or more grid electrode 122 may be coupled to processing system 110 via a common conductive routing trace 242, in other words, the traces $242_{(1,1)}$, $242_{(1,B)}$, $242_{(A,1)}$, and $242_{(A,B)}$ are ganged together. In such an embodiment, a multiplexer (or similar circuitry) may be used to switch between grid electrodes 122.

The plurality of grid electrodes 122 may be arranged in an orientation having an aerial extent extending farther in a first direction than a second direction, the second direction orthogonal to the first direction. In one embodiment, each gird electrode 122 is arranged in an orientation having an aerial extent extending farther in the first direction than the second direction. In another embodiment, each gird electrode 122 is arranged in an orientation having an aerial extent extending farther in the second direction than the first direction. In yet other embodiments, each grid electrode 122 is arranged in an orientation having an aerial extent extending a substantially equal distance in the first and second directions. Further, the grid electrodes 122 may be configured such that one or more grid electrode 122 has an aerial extent which is oriented differently than at least one other grid electrode 122. For example, a first grid electrode 122 may extend further in the first direction than the second direction and a second grid electrode 122 may extend further in the second direction than the first. In other examples, other combinations of grid electrode 122 orientations are possible. In other embodiments, the grid electrodes 122 may be oriented such that each grid electrode 122 is substantially similar in size. At least one of the sensor electrodes 120 or sets of sensor electrodes 120 may be similarly configured as described above with reference to the grid electrodes 122.

Figure 2D:
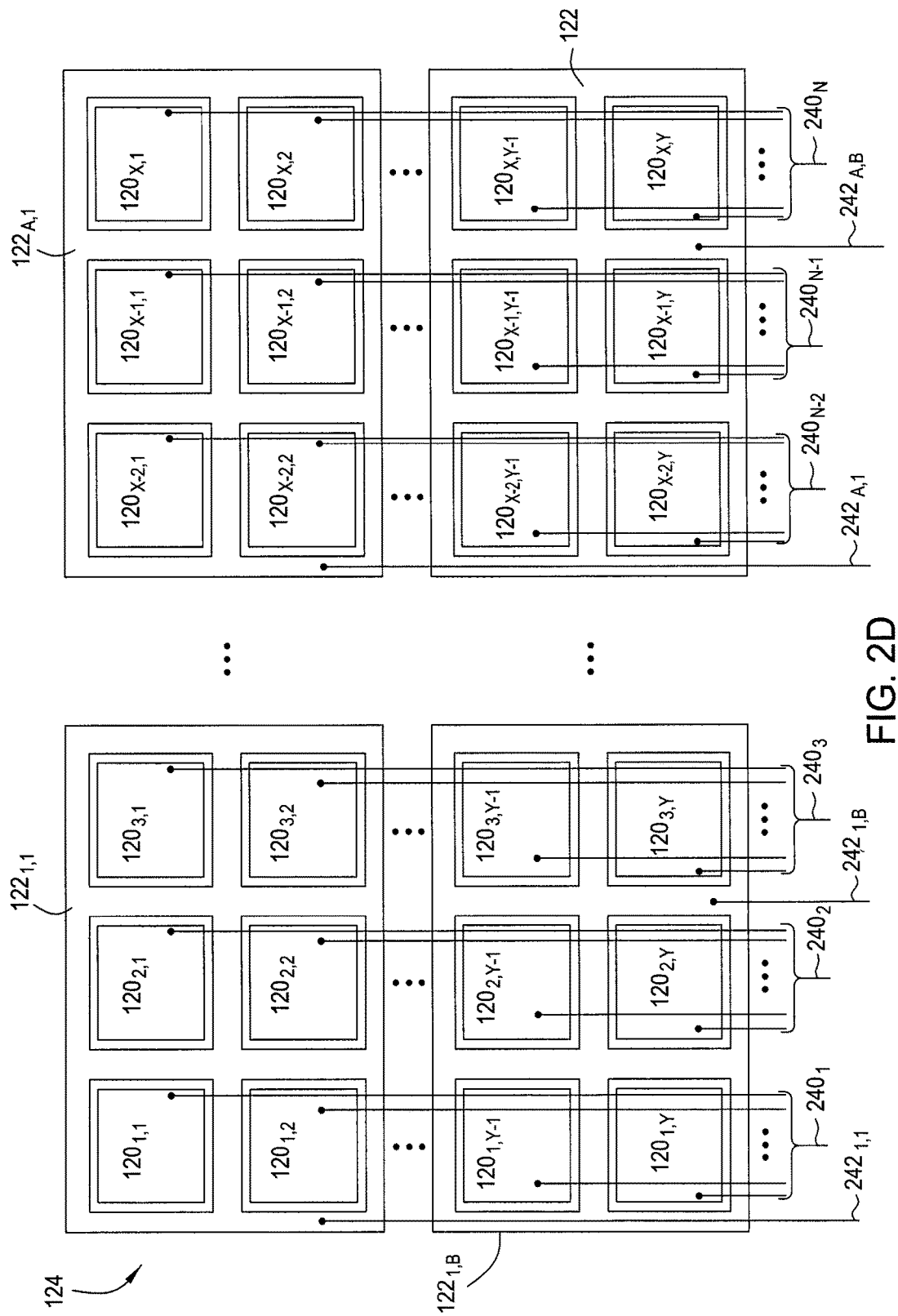
FIG. 2D illustrates yet another alternative array of sensor elements that may be used in the input device of FIG. 1.

In some embodiments, a set of sensor electrodes 120 circumscribed by a single grid electrode 122 may be aligned in a single row. In other embodiments, a set of sensor electrodes 120 circumscribed by a single grid electrode 122 may be linearly aligned in a single row, such as shown in the embodiment depicted in FIG. 2C. In yet other embodiments, a set of sensor electrodes 120 circumscribed by a single grid electrode 122 may be aligned in a plurality of rows, such as shown in the embodiment depicted in FIG. 2D. The number and/or orientation of the sensor electrodes 120 circumscribed by one grid electrode 122 may be the same as, or different than, the number and/or orientation of the sensor electrodes 120 circumscribed by a different grid electrode 122.

In the embodiments, one or more sensor electrodes 120 may share a coupling to the processing system 110. The sensor electrodes 120 may be grouped such that at least two are coupled in a direction that is orthogonal to the orientation of the grid electrode 122. For example, multiple sensor electrodes $120_{(3,1)}$, $120_{(3,2)}$, $120_{(3,Y-1)}$, and $120_{(3,Y)}$ have an orientation that is orthogonal to grid electrode $122_{(1,1)}$ and may be coupled to a common conductive routing trace $240_3$. In another example, each sensor electrode 120 may be coupled to a different conductive routing trace 240 and to a common pin of processing system 110. A multiplexer (or similar circuit element) may be coupled to the conductive routing trace or traces 240 so that the sensor electrodes 120 may be individually coupled to the processing system 110 when sharing a conductive routing trace 240. In one other example, each sensor electrode 120 may be coupled to a different conductive routing trace 240, where each conductive routing trace 240 is coupled to a different pin of processing system 110. Processing system 110 may be configured to simultaneously receive with multiple sensor electrodes 120 or receive with each sensor electrode 120 independently. In one embodiment, processing system 110 may be configured to receive with a plurality of sensor electrodes 120 using a scanning, time multiplexed, scheme when more than one grid electrode is driven with a transmitter signal. The grid electrodes may be adjacent to each other or non-adjacent to each other. In one embodiment, two sensor electrodes may be simultaneously received with while grid electrode that corresponds to one of the sensor electrodes is driven with a transmitter signal.

Processing system 110 may be configured to simultaneously drive transmitter signals onto each grid electrode 122 and receive resulting signals with the sensor electrodes 120. In such an embodiment, each grid electrode 122 may be driven with a transmitter signal that is based on a different one of a plurality of digital codes. The digital codes may be any code such that they provide mathematical independent results. In one embodiment, the digital codes for the set of transmitters are substantially orthogonal—i.e., exhibit very low cross-correlation, as is known in the art. Note that two codes may be considered substantially orthogonal even when those codes do not exhibit strict, zero cross-correlation. In a particular embodiment, for example, the digital codes are pseudo-random sequence codes. In other embodiments, Walsh codes, Gold codes, or another appropriate quasi-orthogonal or orthogonal codes are used. In another embodiment, processing system 110 is configured to simultaneously drive the grid electrodes 122 with the same transmitter signal while independently receiving with the sensor electrodes 120. Some substantially orthogonal codes may be selected that have near zero sums which reduce the effect of the codes coupling to display elements, one set of such codes are circulant codes where each code vector is a rotation of the other vectors.

Processing system 110 may be configured to scan through the grid electrodes 122, driving transmitter signals on to the grid electrodes 122 one at a time, while receiving with the sensor electrodes 120. In one embodiment, only those sensor electrodes 120 that are circumscribed by the grid electrode 122 which is being driven are received with. In other embodiments, all of or some portion of the sensor electrodes 120 may be received with a grid electrode 122 that is being driven.

Processing system 110 may be configured to selectively configure the grid electrode 122 or sensor electrodes 120 based on the positional information of an input object 140. For example, in one embodiment, processing system 110 may drive transmitter signals onto the grid electrodes 122 such that the grid electrode is driven as one large grid electrode 122. Processing system 110 may selectively drive only a portion of the grid electrodes 122 that are proximate the detected input object or objects 140. In another embodiment, For example, in one embodiment, processing system 110 may drive shielding signals onto the grid electrodes 122 such that the grid electrode is driven as one large grid electrode 122. Further, processing system 110 may selectively drive only a portion of the grid electrodes 122 with a shielding signal that are proximate the detected input object or objects 140. In one embodiment the driving scheme (as discussed above) used to drive the grid electrode 122 may vary based on the positional information of the input object or objects 140.

Figure 3:
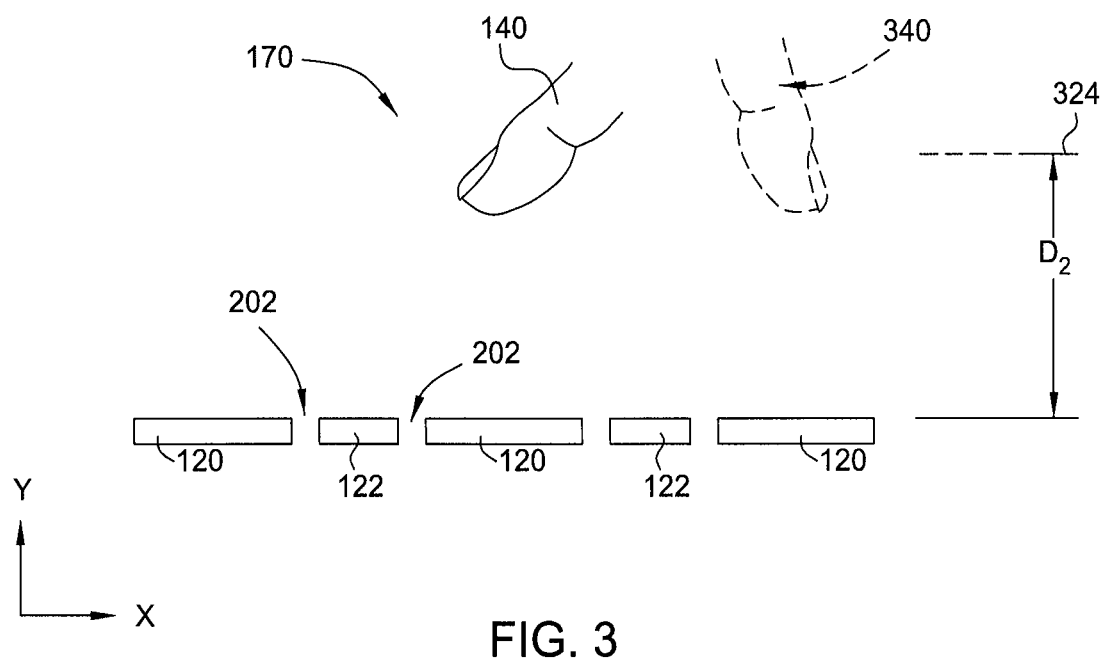
FIG. 3 is a simplified sectional view of the sensor elements of FIG. 1 illustrating the active portion of the sensor electrodes aligned with pixels elements of a display.
Figure 4:
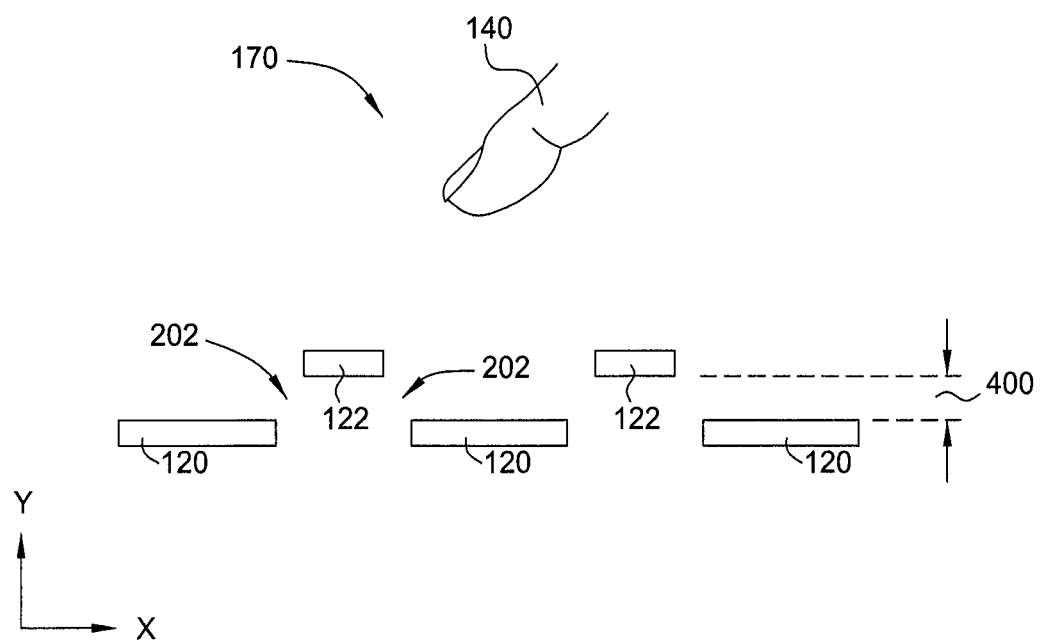
FIG. 4 is a simplified sectional view of another embodiment of the sensor assembly of FIG. 1 illustrating grid electrodes offset above sensor electrodes.
Figure 5:
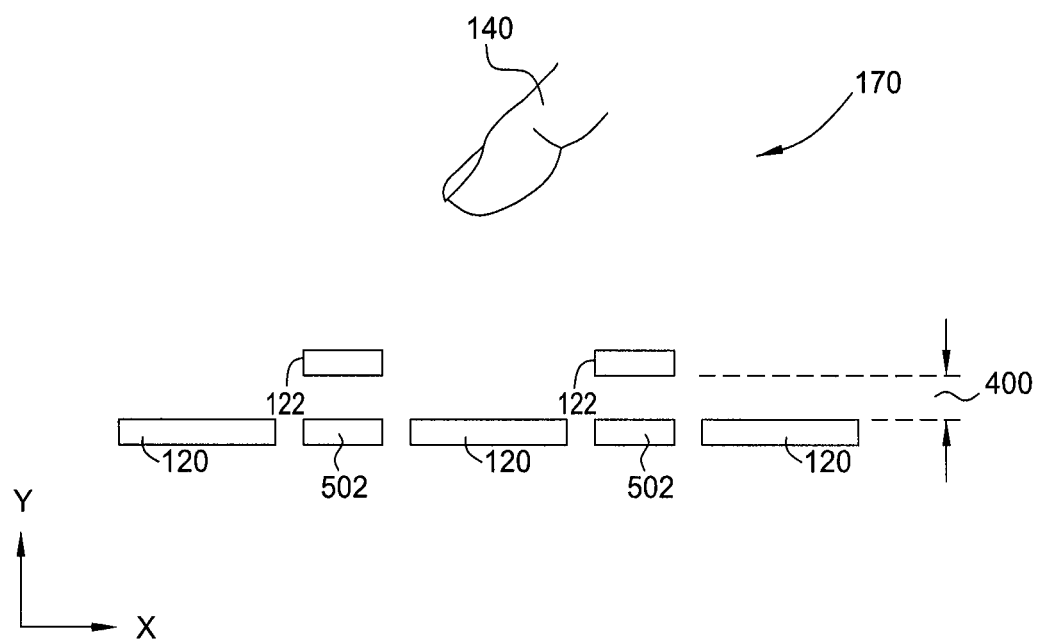
FIG. 5 is a simplified sectional view of yet another embodiment of the sensor assembly of FIG. 1 illustrating grid electrodes offset above sensor electrodes, wherein some sensor electrodes are aligned with the grid electrodes.

FIG. 3 through FIG. 5 depict embodiments of the sensing elements 124 operating in a first mode configured for absolute sensing. Operating the grid electrode 122 as a shield electrode allows for the reduction of the size of the sensor electrodes 120 and/or to control the capacitive coupling between the sensor electrodes 120 and input objects.

Referring first to FIG. 3, a simplified sectional view of the sensing elements 124 of FIG. 1 is shown. The grid electrodes 122 are illustrated coplanar with the sensor electrodes 120. The grid electrode 122 may comprise the common electrodes and overlap the pixel electrodes, similar to the sensor electrodes 120. In at least some embodiments, the grid electrode 122 may be at least as big, if not larger than the sensor electrodes 120. The grid electrode 122 and the sensor electrodes 120 may optionally be fabricated from a single layer of conductive material. In one embodiment, each sensor electrode 120 has a dimension corresponding to a dimension of pixel elements of the display device 160 such that the sensor electrodes 120 do not substantially block a portion of a displayed image. In other embodiments, each sensor electrode 120 has a dimension corresponding to a non-integer number of pixel elements. In such an embodiment, the division between sensor electrode and between sensor electrodes and grid electrode 122 may occur within a pixel element. The distance between the grid electrode 122 and sensor electrode 120 may be equal to the distance between sub-pixels. In one embodiment, the spacing between adjacent the sensor electrodes 120, i.e., the distance across the gap 202, is less than or equal to the spacing of a black-mask of the display device 160, for example, in the range of a few micro-meters. In one embodiment, the spacing between adjacent the sensor electrodes 120, i.e., the distance across the gap 202, is equal to one or more subpixels of the display device 160.

Optionally as seen in the enlargement depicted at the upper left portion of FIG. 2A, the sensor electrode 120 may be paired with a floating electrode 250. In one embodiment, the sensor electrodes 120, floating electrode(s) 250 and the grid electrode 122 may cover the entire Vcom plane. The shape of the paired sensor electrode 120 and the floating electrode 250 may be selected for specific applications, and in one embodiment, the area of the paired sensor electrode 120 is smaller than the area of the floating electrode 250, for example by less than 50 percent.

The grid electrode 122, as discussed above, is disposed between the sensor electrodes 120. In another embodiment, the grid electrode 122 comprises one or more common electrodes of the display device. In such embodiments, the grid electrode 122 is laterally spaced apart from the two sensor electrodes 120 a distance corresponding to the distance between pixel elements of the display device. The width of the portion of the grid electrode 122 disposed between adjacent sensor electrodes 120 may be balanced to improve the settling time of the grid electrode, as well as number of conductive traces 142 and their connections to different portions of the grid electrode 122, if segmented. In one embodiment, the grid electrode 122 is disposed such that it is between and at least partially overlaps with at least two sensor electrodes.

In the first mode of operation, the sensor electrodes 120 are configured to both be driven with a modulated signal provided by the processing system 110 and the capacitive coupling between the modulated sensor electrode(s) and an input object is measured. In one or more embodiments resulting signals comprises effect corresponding to the modulated signals are received with the sensor electrodes and the capacitive coupling between the sensor electrode(s) and the input object is based on the resulting signals. The measurements may be utilized by the processing system 110 or other processor to determine the position of the input object based on a measurement of absolute capacitance. As a modulated signal is driven onto the sensor electrodes 120 by the processing system 110, an electric field is generated by each sensor electrode 120 and extends from the plane of the sensor electrodes 120.

The shielding signal provided by the processing system 110 to the grid electrode 122. The shielding signal may be a varying voltage (i.e., guarding signal) or a constant (i.e., fixed potential) voltage such as system ground or any other constant voltage. In one embodiment, the shielding signal and the relative position of the grid electrode 122 between adjacent sensor electrodes 120 functions to reduce the capacitive coupling between sensor electrodes and the grid electrode 122. Since the grid electrode 122 may be configured to reduce the parasitic capacitive coupling between sensor electrodes 120 and grid electrode 122, greater positional accuracy of an input object 140 may be determined. Additionally, as the grid electrode 122 shields and guards sensor electrodes 120, the input device 100 is also able to provide accurate multi-touch finger tracking capability without blurring the object across multiple sensor electrodes 120 since the dimensions of the sensor electrodes 120 may be reduced. Thus, in many embodiments, use of the grid electrode 122 enable of good multi-touch performance even while only a portion of the common electrode layer of the input device 100 is operating in an absolute sensing mode.

In various embodiments, a property of the shielding signal may be varied. For example, in a first time period, the grid electrode 122 may be driven with a shielding signal that is in-phase with the modulated signal and having a first amplitude selected. In a second time period, the amplitude of the shielding signal can be reduced to a second amplitude which is less than the first amplitude or the amplitude of the shielding signal may be increases to a third amplitude which is greater than the first amplitude. In a third time period, the amplitude of shielding signal could be further reduced to a substantially fixed potential. Furthermore, the grid electrode may be alternatively be driven with a shielding signal that is out of phase with the modulated signal provided to the sensor electrodes 120. In one embodiment, the amplitude and/or phase of the shielding signal may be varied as input objects progressively approach the input device 100. In one embodiment, the amplitude and/or phase of the shielding signal may be varied based on the operation mode of the input device 100. For example, the grid electrode 122 may be driven with a first shielding signal when the sensor electrodes 120 are driven as transmitter electrodes and a second shielding signal when the sensor electrodes 120 are driven as absolute sensor electrodes. The first and second sensor electrodes may differ in at least one of a phase, amplitude and/or frequency. In one embodiment, the grid electrode 122 may be electrically floated when the sensor electrodes 120 are driven as transmitter electrodes and a shielding signal when the sensor electrodes 120 are driven as absolute sensor electrodes.

In conventional input devices not configured with grid electrodes, the separation between sensor electrodes results in a capacitive coupling between individual sensor electrodes and/or between the sensor electrode and other conductors such as display electrodes. In various embodiments, in input devices not configured with grid electrodes, as the distances which the sensor electrodes are separated decreases and/or the distance between which the sensor electrodes and other conductors are separated decreases, the capacitive coupling between the sensor electrodes increases. The capacitive coupling is present spatially across multiple individual sensor electrodes. This results in degraded multi-touch performance, as responses of individual touching fingers are less spatially localized.

However, the grid electrode 122 being configured to shield, actively driven with a shielding signal or electrically floated, while sensing touch decreases cross-coupling (capacitive coupling) of sensor electrodes 120 and neighboring conductors. Thus, the grid electrode 122 functions to prevent the effects of nearby conductors on the sensor electrodes 120.

FIG. 4 is a simplified sectional view of another embodiment of the sensor assembly. The grid electrode 122 is located on a layer between an input surface and the sensor electrodes 120. The grid electrode 122 is illustrated parallel with a plane defined by the sensor electrodes 120. The grid electrode 122 and the sensor electrodes 120 may be fabricated on the same substrate, or on different substrates comprising the input device 100 and/or display device 160. The sensor electrodes 120 and grid electrode 122 are generally aligned with the pixel elements of the display device 160 as described above. Optionally, one or more of the grid electrode 122 may overlap with the sensor electrodes 120.

The grid electrode 122 is spaced above the sensor electrodes 120 by a distance 400. The spacing of the grid electrode 122 above the sensor electrodes 120 may control the capacitive coupling between input objects and the sensor electrodes 120 as compared to the coplanar grid electrode 122 illustrated in FIG. 3 thereby providing increased positional accuracy of an input object 140. While the grid electrode 122 is illustrated as being above the sensor electrodes 120, in other embodiments, the grid electrode may be disposed below the sensor electrodes 120. In one embodiment a second grid electrode may be disposed between and on the same layer as the sensor electrode below the grid electrode 122. In one embodiment the grid electrode 122 may overlap two sensor electrodes of the plurality of sensor electrodes 120. In one or more embodiment, the grid electrode 122 may overlap at least a portion of sensor electrodes 122. The grid electrode 122 may comprise a body of material having openings formed therethrough. For example, the grid electrode 122 may be formed from a mesh of conductive material, such as a plurality of interconnected thin metal wires. One or more of the interconnected thin metal lines may overlap a sensor electrode. Further, the interconnected thin metal wires may be disposed on any layer above the sensor electrodes 120 and may be disposed using a separate process. Further, multiple thin metal lines of the conductive material may overlap each sensor electrode.

In the embodiment, shown in FIG. 5, having some of the sensor electrodes 120, specifically sensor electrodes 502, directly beneath the grid electrode 122 allows the sensor electrodes 120 to be smaller compared to the sensor electrodes 120 illustrated in FIG. 4. The smaller sensor electrodes 120 illustrated in FIG. 5 have capacitance to an input object different than the larger sensor electrodes.

Any of the arrangement of sensing elements 124 illustrated in FIGS. 2-5 may be alternatively utilized in the second mode of operation. As discussed above, in the second mode of operation the sensor electrode 120 are utilized to detect the presence of an input object via transcapacitive sensing when a transmitter signal is driven onto the grid electrode 122. That is, the grid electrode 122 is configured to transmit a transmitter signal provided by the processing system 110 and each sensor electrode 120 is configured to receive a resulting signal comprising effects corresponding to the transmitter signal, which is utilized by the processing system 110 or other processor to determine the position of the input object. The settling performance in transcapacitive second mode is improved over that of a conventional bars/stripes sensors in that the large surface area of the grid electrode 122 may have a reduced resistance as compared to conventional transmitter electrodes in that the transmitter signal does not have to be driven through long traces routed down the sides of the display active area as in conventional transmitter electrodes. The settling performance of the grid electrode 122 can be further improved in a matrix-addressed scheme by reducing the effective capacitance of the grid electrode 122 by applying a shielding signal configured to guard the grid electrode 122 from those sensor electrodes 120 which are actively being utilized as receiver electrodes.

In one embodiment, the grid electrode 122 operating in the second mode functions as a single transmitter electrode and each of the arrayed matrix of sensor electrodes 120 functions as a receiver electrode for transcapacitance sensing operation. With all the sensor electrodes 120 functioning as receiver electrodes, all resulting signals may be acquired at one moment in time. Alternatively, multiplexing can be utilized to scan through sensor electrodes 120 functioning as receiver electrodes.

In one embodiment of operation in the second mode, the sensor electrodes 120 may be addressed in a matrix by utilizing a grid electrode 122 that has been divided into multiple segments (such as segments 230, 232, 234 illustrated in FIG. 2A) that can be independently and sequentially driven to determine the X and Y location of the input object 140 relative to the input device 100. Thus, the sensor electrodes 120 acting as receiver electrodes may be scanned while using different portions of the grid electrode 122 as transmitter electrodes to increase the positional accuracy of the input device 100. For example, one or more geometric characteristics of the grid electrode 122, such as the orientation (aspect ratio), geometric profile and/or plan area, may be, in the second mode of operation, changed using switches or any other means to selectively connect segments of the grid electrode 122. Changing the geometric characteristics of the grid electrode 122 may be useful when, in one mode, use of the grid electrode 122 is desirable in one configuration, yet in another mode, when transcapacitive sensing between sensor electrodes 120, configuration of at least some or all of the area of the grid electrode 122 as part of either the transmitter or receiver electrodes.

As discussed above, it may be advantageous to selectively operate in either the first or second modes. For example, a single structure of sensing elements 124 can operate in an absolute sensing mode (i.e., first mode) utilizing the grid electrode 122 to control the capacitive coupling between the sensor electrodes 120 and an input object, or selectively in the second mode utilizing the grid electrode 122 as a transmitter electrode and the matrix of sensor electrodes 120 as receivers electrodes, thereby increasing definition between multiple objects in the sensing regions 170 and providing improved detection of motion objects within the sensing regions 170. In one embodiment, the absolute sensing mode may be a tunable, selectively switching between different amplitudes and/or phases. Selectively operating in different modes may be based on a whether an input object is determined to be in first portion of the sensing region or a second portion of the sensing region, the first portion being between the second portion and an input surface of the sensing device. The phase and/or amplitude of the signal driven onto the grid electrode 122 and/or the sensor electrodes 120 may be varied based on the operating mode.

As discussed above, the sensing elements 124 may be configured to operation in other transcapacitive modes. For example, FIG. 6 is a simplified schematic plan view of sensing elements 124 configured for operating in a transcapacitive third mode of operation.

In a third mode of operation, the sensor electrodes 120 are split into a group of transmitter electrodes 602 and a group of receiver electrodes 604. The particular sensor elements 120 designated as transmitter electrodes 602 and receiver electrodes 604 may be assigned by the processing system 110 according to a predefined criteria or predefined sequence. For example, the particular sensor elements 120 designated as transmitter electrodes 602 and receiver electrodes 604 may be selected in response to an input object in a predefined location in the sensing region 170 or a predefined resulting signal received on one or more of the receiver electrodes 604. Alternatively, the sensor elements 120 designated as transmitter electrodes 602 and receiver electrodes 604 may be assigned in accordance to a predetermined programmed sequence.

Figure 6:
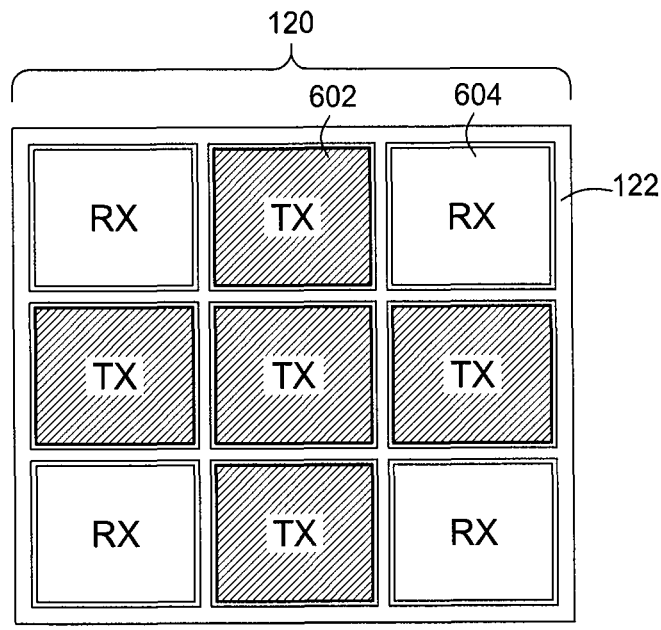
FIG. 6 is a simplified schematic plan view of sensor elements operating in a transcapacitive mode.

In the embodiment depicted in FIG. 6, each transmitter electrodes 602 is located adjacent to at least one receiver electrode 604. Two or more transmitter electrodes 602 may also bound a single receiver electrode 604. During sensing in the third mode of operation, the grid electrode 122 may be floated or driven with a shielding signal that has a constant voltage. The shielding signal may be driven out of phase with the transmitter signal, modulated similar to the transmitter signal, have the same or different waveform or amplitude of the transmitter signal or combinations of thereabove.

Optionally, during the third mode of operation one or more of the sensor electrodes 120 functioning as the transmitter electrodes 602 may be switched to function as a receiver electrode 604. The switching of sensor electrodes 120 between receivers and transmitters may be accomplished by multiplexing. As shown in the embodiment depicted in FIG. 7, all the sensor electrodes 120 functioning as transmitter electrodes 602 in FIG. 6 have been switch to function as receiver electrodes 704, while all the sensor electrodes 120 functioning as receiver electrodes 604 in FIG. 6 have been switched to function as transmitter electrodes 702. The switching between assignment as receiver and transmitter electrodes may occur over two or more multiplexing steps. Switching of the sensor electrodes 120 between functioning as receiver and transmitter electrodes allows a capacitive image to be captured in reduced period of time compared to scanning through each of the transmitter electrodes individually. For example, the modulate pattern shown in FIGS. 6 and 7 allows a capacitive image to be captured after two modulate periods. In other embodiments, various other sensing patterns may be used, where more or less modulate periods may be used. For example, the sensor electrodes may be selectively configured as transmitter and receiver electrodes such that 4 or 8 modulate periods are needed to determine the capacitive image. However, in other embodiments, other modulate patterns may be used that need any number of modulate periods to determine the capacitive image.

Figure 8:
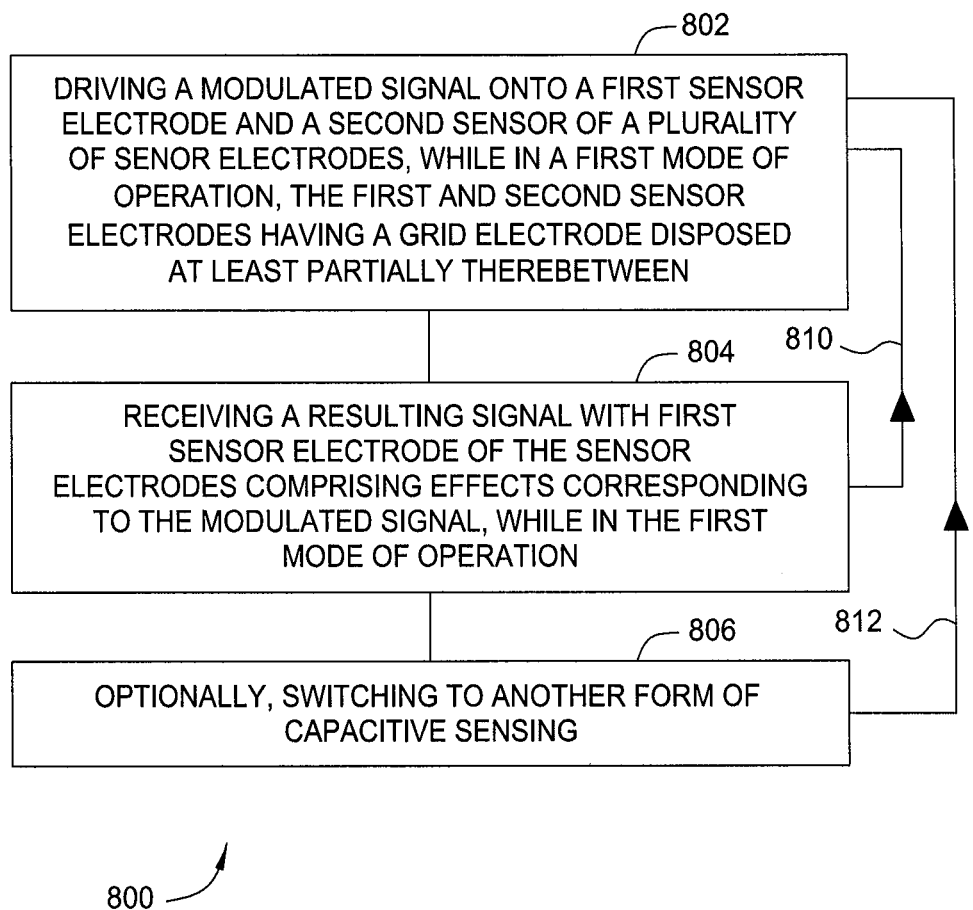
FIG. 8 is a flow diagram of one embodiment of a method for detecting presence of an input object.

FIG. 8 is a flow diagram of one embodiment of a method 800 for detecting presence of an input object. The method 800 utilizes a capacitive sensing device, such as the input device 100 described above, to perform an absolute sensing routine. The capacitive sensing device utilized to perform the method 800 includes a grid electrode disposed between a first sensor electrode and a second sensor electrode of a plurality of sensor electrodes. The method begins at step 802 by driving a modulated signal onto a first sensor electrode of the sensor electrodes 120 while in a first mode of operation. The method 800 proceeds to step 804 by determining the absolute capacitive coupling of the first sensor electrode of the sensor electrodes 120, while in the first mode of operation. The resulting signal may be utilized to determine the presence, or lack thereof, of an input object in the sensing region 170 by the processing system 110 or the electronic system 150.

Non-limiting examples of the first mode of operation have been provided above with reference to FIG. 2A through FIG. 5. It is contemplated that the method 800 may be practiced utilizing other sensor configurations associated with one or more grid electrodes.

The method 800 may include driving a shielding signal on the first shaping electrode to reduce the parasitic capacitive coupling and/or interference from nearby conductors in resulting signals from neighboring sensor electrodes in simultaneously with the performance of step 802. The method 800 may also include changing the shielding signal driven on the first shaping electrode over subsequent iterations of steps 802 and step 804. Non-limiting examples of the methodology for changing the shielding signal are described above at least with reference to FIGS. 2, 3 and 4.

The method 800 may optionally include step 806 in which the mode of operation is switched to a transcapacitive mode of operation. For example, the absolute sensing mode provided by steps 802 and 804 may be switched to a transcapacitive mode of operation, such as to one or both of a second mode of operation, illustrated by the flow diagram of FIG. 9, and to a third mode of operation, illustrated by the flow diagram of FIG. 10.

The method 800 additionally includes optional a step in which the driver module 208 drives a display update signal onto the common electrodes which comprise one or more of the sensor electrodes 120. The display update signal is generally provide during a non-display update (i.e., sensing) period, for example, during the period when step 802 and step 804 are not being performed.

Portions of the method 800 may optionally be repeated over one or more iterations, as indicated by arrows 810, 812, 814. The method 800 may also terminate without performance of one of step 806. The method 800 may also be performed on other input devices, including those not associated with display devices.

Figure 9:
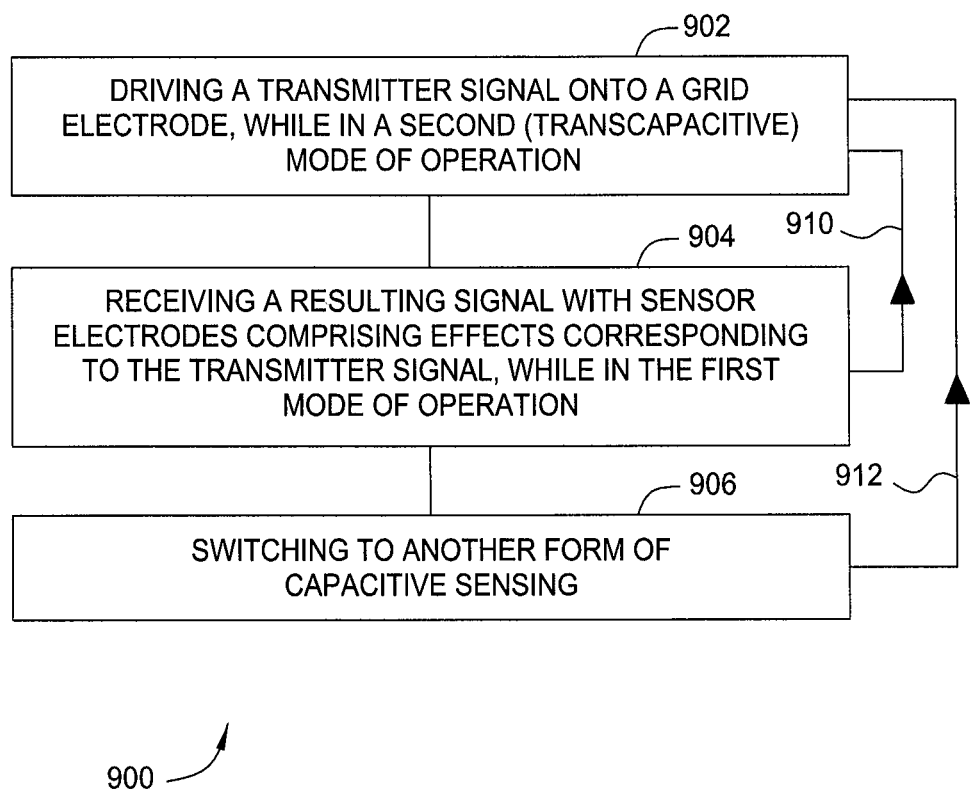
FIG. 9 is a flow diagram of another embodiment of a method for detecting presence of an input object.

FIG. 9 is a flow diagram of another embodiment of a method 900 for detecting presence of an input object. FIG. 9 is a flow diagram of one embodiment of a method 900 for detecting presence of an input object utilizing the second mode of operation, i.e., a transcapacitive sensing routine. The method 900 utilizes a capacitive sensing device, such as the input device 100 described above, the capacitive sensing device having a grid electrode disposed between a first sensor electrode and a second sensor electrode of a plurality of sensor electrodes. The method begins at step 902 by driving a transmitter signal onto a grid electrode 122 while in a second mode of operation. The method 900 proceeds to step 904 by receiving a resulting signal with the sensor electrodes 120 comprising effects corresponding to the transmitter signal, while in the first mode of operation. The resulting signal may be utilized to determine the presence, or lack thereof, of an input object in the sensing region 170 by the processing system 110 or the electronic system 150.

Non-limiting examples of the second mode of operation have been provided above with reference to FIG. 2A. It is contemplated that the method 900 may be practiced utilizing other sensor configurations associated with one or more grid electrodes.

The method 900 may also include changing the signal driven on the grid electrode 122 over subsequent iterations of step 902 and step 904. For example, the grid electrode 122 may be driven with a first transmitter signal having a first amplitude to detect input objects in close proximity to the input device, then driven with a shielding signal having a second amplitude to detect input objects further from and in far field proximity to the input device with less interference from neighboring electrodes.

The method 900 may also include multiplexing the transmitter signal driven on different segments of the grid electrode 122 over subsequent iterations of step 902 and step 904. For example, one segment of the grid electrode 122 may be driven with a transmitter signal to detect input objects in one portion of the sensing region 170 the input device 100, then another segment of the grid electrode 122 may be driven with a transmitter signal to detect input objects in a different portion of the sensing region 170 the input device 100, thereby improving the resolution of the determination of the location of the input object relative to the input device 100.

The method 900 may optionally include step 906 in which the mode of operation is switched to either a third (transcapacitive) mode of operation, illustrated by the flow diagram of FIG. 10, or to a first (absolute) mode of operation, as previously described with reference to the flow diagram of FIG. 8.

The method 900 additionally includes optional step in which the driver module 208 drives a display update signal onto the common electrodes which comprise one or more of the sensor electrodes 120. The display update signal is generally provide during a display update (i.e., sensing) period, for example, during the period when step 902 and step 904 are not being performed.

The method 900 may also terminate without performance of step 906. The method 900 may also be performed on other input devices, including those not associated with display devices.

Portions of the method 900 may optionally be repeated over one or more iterations, as indicated by arrows 910, 912, 914. The method 900 may also terminate without performance of step 906. The method 900 may also be performed on other input devices, including those not associated with display devices.

Figure 10:
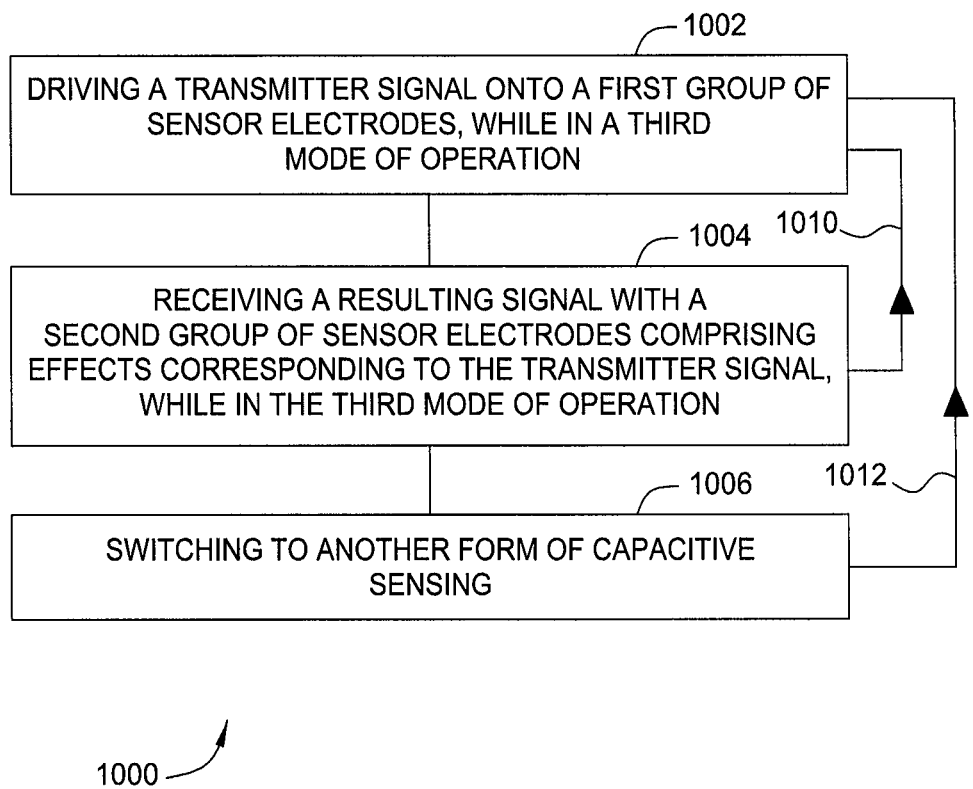
FIG. 10 is a flow diagram of yet another embodiment of a method for detecting presence of an input object.

FIG. 10 is a flow diagram of one embodiment of a method 1000 for detecting presence of an input object utilizing the second mode of operation, i.e., a transcapacitive sensing routine. The method 1000 utilizes a capacitive sensing device, such as the input device 100 described above, the capacitive sensing device having a grid electrode disposed between a first sensor electrode and a second sensor electrode of a plurality of sensor electrodes. The method begins at step 1002 by driving a transmitter signal onto a first group of sensor electrodes 120 (also shown as transmitter electrode 602 in FIG. 6) while in a third mode of operation. The method 1000 proceeds to step 1004 by receiving a resulting signal with a second group of sensor electrodes 120 (also shown as receiver electrode 604 in FIG. 6) comprising effects corresponding to the transmitter signal, while in the first mode of operation. The resulting signal may be utilized to determine the presence, or lack thereof, of an input object in the sensing region 170 by the processing system 110 or the electronic system 150.

Figure 7:
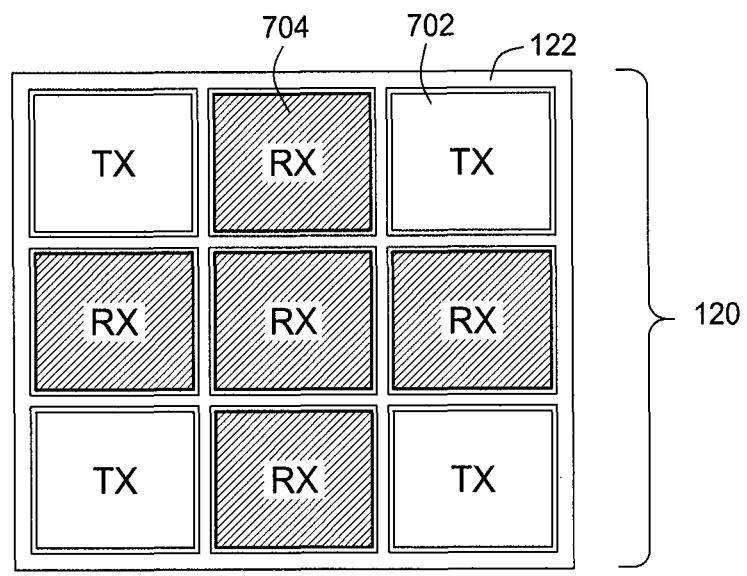
FIG. 7 is another simplified schematic plan view of sensor elements operating in a transcapacitive mode.

Non-limiting examples of the third mode of operation have been provided above with reference to FIG. 6, with optional steps described with reference to FIG. 7. It is contemplated that the method 1000 may be practiced utilizing other sensor configurations associated with one or more grid electrodes.

The method 1000 may also include multiplexing the transmitter signal driven on different groups of the sensor electrodes 120 over subsequent iterations of step 1002 and step 1004. For example as shown by the sequence of assignment of the sensor electrodes 120 as transmitter electrodes and receiver electrodes, a first group of the transmitter electrodes 602 may be driven with a transmitter signal and a second group of the receiver electrodes 604 may be configured as receiver electrodes to detect resulting signals corresponding to the transmitter signal, then first group of the transmitter electrodes 602 are reconfigured as receiver electrodes (shown as 704 in FIG. 7) and the second group of the receiver electrodes 604 are reconfigured as transmitter electrodes (shown as 702 in FIG. 7).

The method 1000 may optionally include step 1006 in which the mode of operation is switched to either a second (transcapacitive) mode of operation, illustrated by the flow diagram of FIG. 9, or to a first (absolute) mode of operation, as previously described with reference to the flow diagram of FIG. 8.

The method 1000 additionally includes optional step in which the driver module 208 drives a display update signal onto the common electrodes which comprise one or more of the sensor electrodes 120. The display update signal is generally provide during a non-display update (i.e., sensing) period, for example, during the period when step 1002 and step 1004 are not being performed.

The method 1000 may also terminate without performance of step 1006. The method 1000 may also be performed on other input devices, including those not associ- Portions of the method 1000 may optionally be repeated over one or more iterations, as indicated by arrows 1010, 1012, 1014. The method 1000 may also terminate without performance of step 1006. The method 1000 may also be performed on other input devices, including those not associated with display devices.

Figure 11:
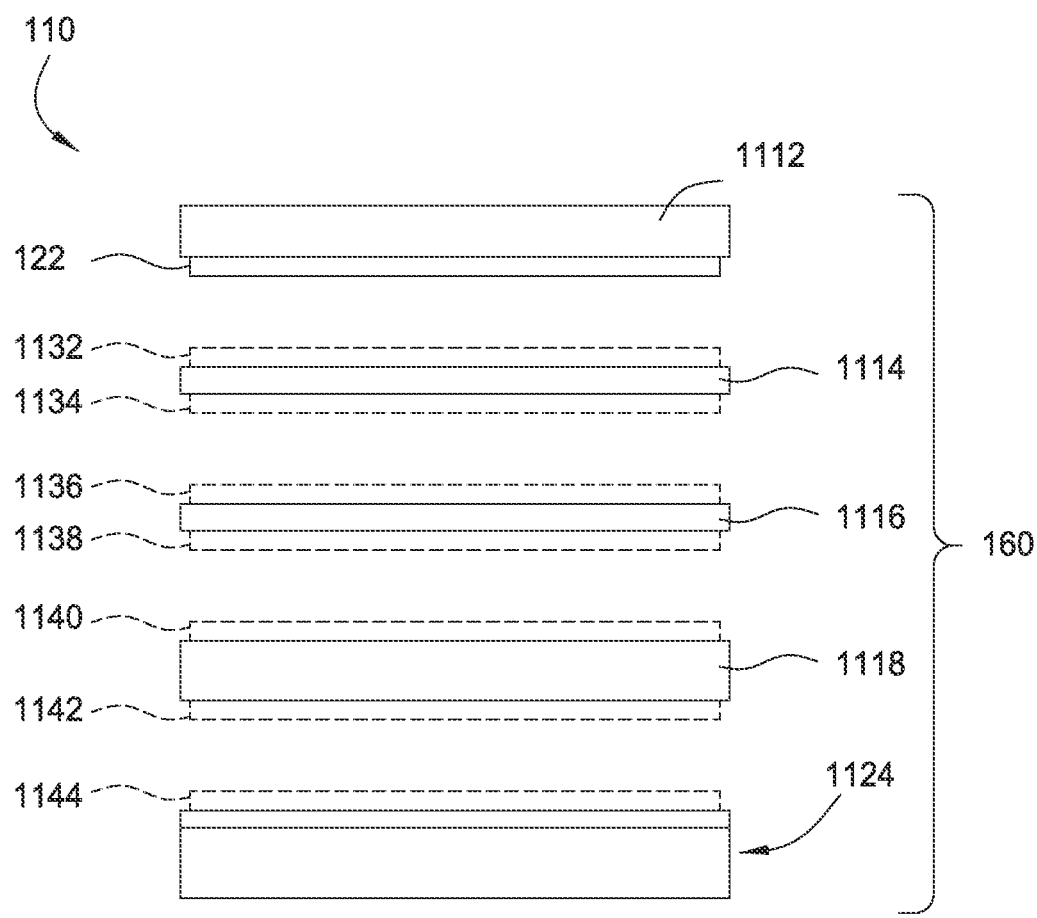
FIG. 11 is an exploded side view of one embodiment of an exemplary display device having an integrated input device illustrating alternative locations for a grid electrode.

FIG. 11 is an exploded side view of one embodiment of an exemplary display device 160 having an integrated input device 160 illustrating alternative locations for a grid electrode 122. The grid electrode 122 of the input device 100 may be within or external to the display device 160. The exploded view of the display device 160 allows various alternative positions of the grid electrode 122 to be illustrated within the display device 160. The sensor electrodes 120 associated with the grid electrode 122 are not shown in the illustration of FIG. 11.

The display device 160 generally includes a plurality of transparent substrates positioned over a substrate 1124 (i.e., TFT glass) of the display device 160. In one embodiment, a plurality of transparent substrates positioned over the substrate 1124 of the display device 160 includes a lens 1112, an optional polarizer 1114, an optional anti-shatter film 1116, and a color filter glass (CFG) 1118. In one embodiment, the grid electrode 122 is disposed at least partially on one of these transparent substrates, and/or on the substrate 1124 of the display device 160. In the embodiment depicted in FIG. 11, the grid electrode 122 is shown disposed on a lower surface (i.e. surface facing substrate 1124 of the active element of the lens 1112.

The grid electrode 122 may be disposed on (1) a separate transparent substrate, (2) at least partially on or fully formed one of the substrates 1112, 1114, 1116, 1118, or (3) at least partially on, fully formed on, or within the substrate 1124 of the active element of the display device.

Additionally shown in FIG. 11 are alternative positions (shown in phantom) for locating the grid electrode 122. For example, the grid electrode 122 may be positioned on, at least partially formed directly on, or fully formed directly on an upper side of the optional polarizer 1114, as illustrated by reference numeral 1132. The grid electrode 122 may alternatively be positioned on, at least partially formed directly on, or fully formed directly on a lower side of the optional polarizer 1114, as illustrated by reference numeral 1134. The grid electrode 122 may alternative be positioned on, at least partially formed directly on, or fully formed directly on an upper side of the optional anti-shatter film 1116, as illustrated by reference numeral 1136. The grid electrode 122 may alternatively be positioned on, at least partially formed directly on, or fully formed directly on a lower side of the optional anti-shatter film 1116, as illustrated by reference numeral 1138. The grid electrode 122 may alternative be positioned on, at least partially formed directly on, or fully formed directly on an upper side of the CFG 1118, as illustrated by reference numeral 1140. The grid electrode 122 may alternatively be positioned on, at least partially formed directly on, or fully formed directly on a lower side of the CFG 1118, as illustrated by reference numeral 1142. In such embodiment, the grid electrode may be aligned with the black mask disposed on the CFG 1118. In any of the above embodiment, the grid electrode 122 may be comprised of a wire mesh material, where the wire mesh material patterned to control the electric field lines of the driven sensor electrodes.

The grid electrode 122 may alternative be positioned on, at least partially formed directly on, or fully formed directly on an upper side of the substrate 1124 of the active element, as illustrated by reference numeral 1144. Where the grid electrode 122 is formed as least partially formed directly on, formed fully on, or within the substrate 1124 of the display device; one or both of the grid electrode 122 and the sensor electrodes 120 may be comprised of common electrodes (segments of segmented V-com electrode 1120), such as illustrated in FIG. 2A, FIG. 2B and FIG. 3.

In one embodiment, the dimensions of each of the sensor electrodes 120 correspond to the dimension of pixel elements. For example, at least one of the length and width of each sensor electrode 120 may correspond to an integer multiple of the number of sub-pixels. In other embodiment, at least one dimension of a sensor electrode may correspond to a portion of a pixel element. For example, one of the length and width may correspond to a non-integer multiple of a number of sub-pixels. In one embodiment, the dimensions of each sensor electrode 120, for example having a quadrilateral form, are at least about 30 sub-pixel elements by at least about 30 sub-pixel elements. In other embodiment, the dimensions of each sensor electrode may correspond an M sub-pixel elements, by N sub-pixel elements; where M and N may be the same or different. Further M and N may each be less than about 30 sub-pixel elements or greater than about 30 sub-pixel elements. In various embodiments, one or more dimensions of the sensor electrode correspond to a non-integer number of sub-pixels elements. For example, the length or width of a sensor electrode may correspond to a portion of a sensor electrode and the gap between sensor electrodes and other sensor electrodes or between sensor electrodes and the grid electrode may be within a sub-pixel.

In one embodiment, the space between each sensor electrode 120 and the grid electrode 122 may correspond to the distance between sub-pixels elements. For example, the dimension of the isolation space between each sensor electrode 120 and the grid electrode 122 may be equal to about 5 micrometers; however, the dimension of the isolation space may be greater than or less than about 0.5 micrometers. Further, the center to center pitch of sensor electrodes 120 may be in a range of about 30 to about 50 sub-pixels. However, the pitch may be less than about 30 sub-pixels and greater than about 50 sub-pixels.

In yet other embodiments, each sensor electrode may have a length and/or width equal to about 1 millimeter. However, the sensor electrodes 120 may have a length and/or width that is greater than 1 millimeter. Further, the center to center pitch of sensor electrodes 120 may be in a range of about 2 to about 5 millimeters. However, the pitch may be less than about 2 millimeters and greater than about 5 millimeters.

In one embodiment, the dimensions of the grid electrode 122 may correspond to the dimensions of the sub-pixel elements. For example, the width of the grid electrode 122 that is disposed sensor electrodes 120 may correspond to an integer multiple of the number of sub-pixels. Further, the width of the grid electrode 122 that is disposed sensor electrodes 120 may correspond to a non-integer multiple of the number of sub-pixels. In one embodiment, the dimensions of the width of the grid electrode 122 is in the range of least about 10 sub-pixel elements to at least about 120 sub-pixel elements. In other embodiments, the width of the grid electrode 122 may be less than 10 sub-pixel elements or greater than 120 sub-pixel elements. Further, the grid electrode may be configured to have a width in the range of about 0.5 millimeters to about 120 millimeters; however, widths below 0.5 millimeters and above 120 millimeters are also possible. In other embodiments, the grid electrode 122 may be configured to have various widths.

Each of the sensor electrodes 120 may be the same size and shape, however, in various embodiments; at least one sensor electrode may have a different size and or shape than the other sensor electrodes 120. The size and shape of the sensor electrode 120 may correspond to a location of the sensor electrodes. For example, a sensor electrode 120 located near the edge of the sensing region may be sized and/or shaped differently than a sensor electrode 120 located near the center of the sensing region.

Figure 12A:
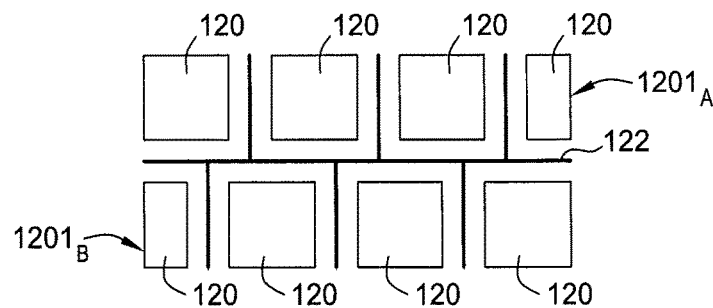
FIGS. 12A-12E illustrate various differently shaped sensor electrodes and grid electrodes.
Figure 12B:
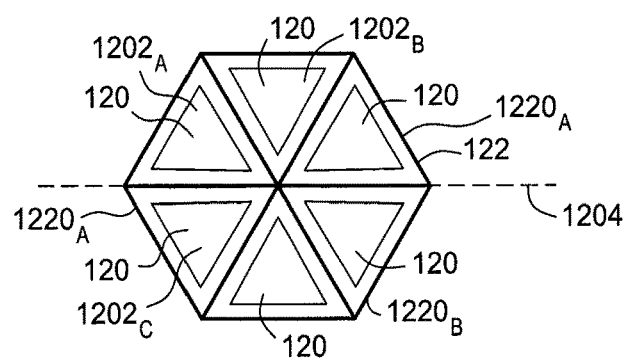
Figure 12C:
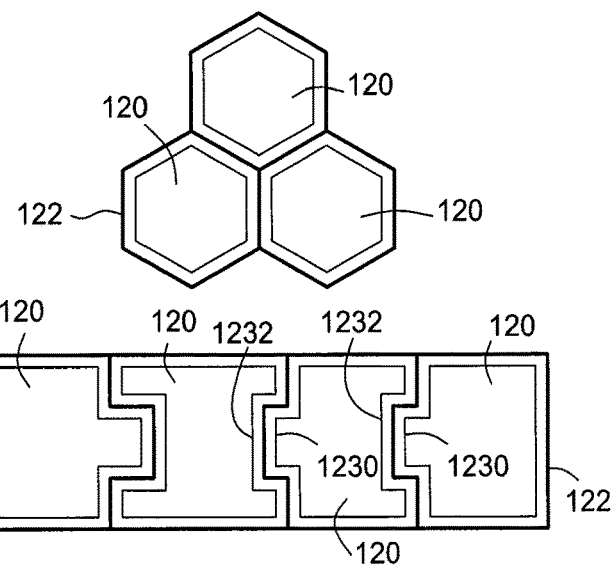
Figure 12D:
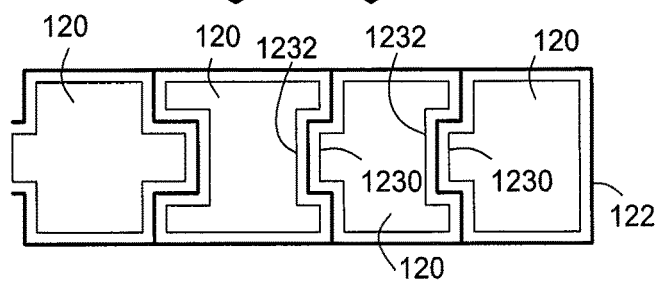
Figure 12E:
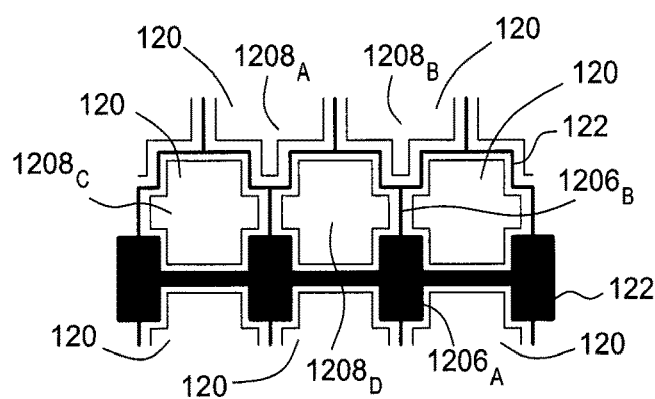

FIGS. 12A-12E illustrate various differently shaped sensor electrodes 120 and grid electrode 122. In the embodiment of FIG. 12A, sensor electrodes 1201A and 1201B are illustrated as having a different size than the other sensor electrodes. Further, as illustrated in FIG. 12A, the position of the sensor electrodes having a different size may vary. In one embodiment, sensor electrode 1201A and sensor electrode 1201B may be aligned in a common row and/or column of the plurality of sensor electrodes. FIG. 12B illustrates an embodiment of sensor electrodes 120, where each sensor electrode is a polygon having less than four sides. Further, as illustrated, in one embodiment, alternating sensor electrodes may be rotated versions of each other (e.g., sensor electrodes 1202A and sensor electrode 1202b). The sensor electrodes may also be mirror symmetric about an axis. For example, sensor electrodes 1202A and 1202C are mirror symmetric about axis 1204. In the embodiment of FIG. 12C, the sensor electrodes 120 comprise a polygon shape having more than four sides; however, in other embodiment, any number of sides may be possible. Further the grid electrode 122 of the embodiment of FIG. 12B and FIG. 12C comprises a plurality of non-parallel and parallel segments. In the embodiment of FIG. 12, the sensor electrodes 120 may be interleaved with each other, such that at least one sensor electrode has a protrusion that is interleaved with another sensor electrode. In one embodiment, alternating sensor electrodes may have protrusions and cutouts such that the sensor electrodes may be interleaved. In other embodiments the sensor electrodes may be interleaved with more than two neighboring sensor electrodes. As illustrated by FIG. 12E, in one embodiment a first set of sensor electrodes are at least partially disposed between a second set of sensor electrodes. For example, sensor electrodes 1208A and 1208B are disposed such that they are interleaved between sensor electrodes 1208C and 1208D. In other embodiments, the sensor electrodes comprise one or more protrusions, but the sensor electrodes are not interleaved with each other. Further, grid electrode 122 may have a reduced width in one more areas between sensor electrodes (e.g., segment 1206). In further embodiments, additional shapes not listed above are also contemplated. In various embodiments, the sensor electrodes may have more than one protrusion at various different angles. For example, shapes such as, but not limited to a "star", "asterisk", "circular", "diamond", and "ellipses" are also contemplated. In one or more embodiments, the shape of the sensor electrodes may be selected to improve the fringing field lines between sensor electrodes and other sensor electrodes or sensor electrodes and the input object. The sensor electrodes may have one or more protrusions (perpendicular to each other or at any angle with each other), one or more angled sides, one or more curved sides, or any combination of the above.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. In view of the foregoing, the scope of the present disclosure is determined by the claims that follow.

What is claimed is:

1. A processing system for an input device, the processing system comprising:
   a sensor module, comprising sensor circuitry configured to couple to a plurality of sensor electrodes, the sensor module is configured to drive a first sensor electrode of the plurality of sensor electrodes to acquire first changes of absolute capacitance during a first non-display update period of a display frame and a second sensor electrode of the plurality of sensor electrodes to acquire second changes of absolute capacitance during a second non-display update period of the display frame, wherein the first non-display update period and the second non-display update period occur between different pairs of display line update periods of the display frame and are at least as long as a display line update period of the display frame.

2. The processing system of claim 1, wherein the sensor module is further configured to drive a grid electrode with a shielding signal during the first and second non-display update periods, wherein at least a segment of the grid electrode is disposed between the first and second sensor electrodes.

3. The processing system of claim 2, wherein the sensor module is further configured to drive the grid electrode with the shielding signal comprising a varying voltage.

4. The processing system of claim 1 further comprising:
   a determination module configured to determine a capacitive image based on the first and second changes of absolute capacitance, and wherein the first changes of absolute capacitance corresponds to a first pixel of the capacitive image and the second changes of absolute capacitance corresponds to a second pixel of the capacitive image.

5. The processing system of claim 1, wherein the first changes of absolute capacitance corresponds to a first pixel of a capacitive image and the second changes of absolute capacitance corresponds to a second pixel of the capacitive image.

6. The processing system of claim 1, wherein the plurality of sensor electrodes are disposed in a matrix array of discrete sensor electrodes.

7. The processing system of claim 1, wherein each of the plurality of sensor electrodes comprise a common electrode of a plurality of common electrodes of a display device.

8. The processing system of claim 1 further comprising:
   a display driver module coupled to a plurality of display electrodes of a display device, the display driver module comprising circuitry configured to drive the display electrodes to update a display of the display device.

9. The processing system of claim 8, wherein the sensor module is disposed on a first integrated circuit and the display driver module is disposed on a second integrated circuit.

10. The processing system of claim 8, where the sensor module and the display driver module are disposed on a first integrated controller.

11. An input device comprising:
    a plurality of sensor electrodes, each sensor electrode of the plurality of sensor electrodes comprising at least one common electrode of a plurality of common electrodes of a display device, the plurality of sensor electrodes disposed in a matrix array of discrete sensor electrodes;

a processing system coupled to the plurality of sensor electrodes and configured to:

drive a first sensor electrode of the plurality of sensor electrodes for capacitive sensing during a first non-display update period of a display frame, and drive a second sensor electrode of the plurality of sensor electrodes for capacitive sensing during a second non-display update period of the display frame, wherein the display frame comprises a plurality of display line update periods and wherein the first non-display update period and the second non-display update period occur between different pairs of the plurality of display line update periods and wherein the first non-display update period and the second non-display update period are at least as long as one of the display line update periods.

12. The input device of claim 11 further comprising:
a grid electrode at least partially disposed between the first sensor electrode and the second sensor electrode, wherein the grid electrode comprises at least one common electrode of the plurality of common electrodes, and wherein the processing system is configured to drive the grid electrode with a shielding signal during the first and second non-display update periods.

13. The input device of claim 12, wherein the processing system, when driving the first sensor electrode and the second sensor electrode for capacitive sensing, is further configured to drive the first and second sensor electrodes with a modulated signal, and wherein the shielding signal and the modulated signal are similar in at least one of phase and amplitude.

14. The input device of claim 11, wherein, the processing system, when driving the first sensor electrode and the second sensor electrode for capacitive sensing, is further configured to drive the first and second sensor electrodes with a modulated signal for absolute capacitive sensing.

15. The input device of claim 11 further comprising:
a grid electrode wherein at least one segment of the grid electrode is disposed between the first sensor electrode and the second sensor electrode.

16. The input device of claim 15, wherein the processing system is configured to drive the grid electrode with a shielding signal during the first and second non-display update periods.

17. A method for capacitive sensing with a display device comprising an integrated capacitive sensing device, the method comprising:

driving a first plurality of sensor electrodes to acquire first changes of absolute capacitance during a first non-display update period of a display frame and a second plurality of sensor electrodes to acquire second changes of absolute capacitance during a second non-display update period of the display frame, wherein the first non-display update period occurs between first and second display line update periods of the display frame and wherein the second non-display update period occurs between third and fourth display update periods of the display frame, wherein the first and second non-display update periods are at least as long as a display line update period of the display frame; and determining a capacitive image based on the first and second changes of absolute capacitance.

18. The method of claim 17 further comprising driving a gird electrode with a shielding signal during the first and second non-display update periods, wherein the grid electrode is at least partially disposed between the first and second sensor electrodes.

19. The method of claim 17 further comprising driving the second plurality of sensor electrodes with a shielding signal during the first non-display update time period.

* * * * *

UNITED STATES PATENT AND TRADEMARK OFFICE
CERTIFICATE OF CORRECTION

PATENT NO. : 10,088,951 B2
APPLICATION NO. : 14/750721
DATED : October 2, 2018
INVENTOR(S) : Petr Shepelev et al.

Page 1 of 1

It is certified that error appears in the above-identified patent and that said Letters Patent is hereby corrected as shown below:

In the Claims

In Column 32, Line 36, Claim 19, after "update" delete "time".

Signed and Sealed this
Twenty-first Day of April, 2020

Andrei Iancu
*Director of the United States Patent and Trademark Office*